(12) United States Patent  (10) Patent No.: US 6,897,807 B2
Kishigami et al.  (45) Date of Patent: May 24, 2005

(54) RADIO-WAVE ARRIVAL-DIRECTION ESTIMATING APPARATUS AND DIRECTIONAL VARIABLE TRANSCEIVER

(75) Inventors: Takaaki Kishigami, Kanagawa (JP); Takashi Fukagawa, Kanagawa (JP); Yasuaki Yuda, Kanagawa (JP); Masayuki Hoshino, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/817,978

(22) Filed: Apr. 5, 2004

(65) Prior Publication Data

US 2004/0189523 A1 Sep. 30, 2004

Related U.S. Application Data

(60) Continuation of application No. 10/635,411, filed on Aug. 6, 2003, now Pat. No. 6,836,245, which is a division of application No. 10/020,477, filed on Dec. 12, 2001, now Pat. No. 6,642,888.

(51) Int. Cl.[7] .................................................. G01S 5/02
(52) U.S. Cl. ........................................ 342/417; 342/445
(58) Field of Search ................................ 342/417, 434, 342/437, 442, 445

(56) References Cited

U.S. PATENT DOCUMENTS

| 5,262,789 | A | 11/1993 | Silverstein |
| 5,299,148 | A | 3/1994 | Gardner et al. |
| 5,943,013 | A | 8/1999 | Ohashi |
| 6,084,928 | A | 7/2000 | Kuwahara |
| 6,091,361 | A | 7/2000 | Davis et al. |
| 6,208,295 | B1 * | 3/2001 | Dogan et al. ............... 342/378 |
| 6,351,238 | B1 | 2/2002 | Kishigami et al. |
| 6,421,000 | B1 * | 7/2002 | McDowell ............. 342/357.06 |
| 6,446,025 | B1 | 9/2002 | Nakamura et al. |
| 6,483,478 | B2 | 11/2002 | Yu et al. |
| 6,501,747 | B1 * | 12/2002 | Friedlander et al. ........ 370/342 |
| 6,501,943 | B1 | 12/2002 | Ide et al. |
| 6,529,745 | B1 | 3/2003 | Fukagawa et al. |

FOREIGN PATENT DOCUMENTS

| EP | 0 632 286 A2 | 1/1995 |
| EP | 0 971 485 A1 | 1/2000 |
| EP | 1 031 846 A2 | 8/2000 |
| WO | WO 99 65160 A1 | 12/1999 |

OTHER PUBLICATIONS

Schmidt, Ralph O., "Multiple Emitter Location and Signal Parameter Estimation," IEEE Trans., vol. AP–34, No. 3, pp. 276–280 (Mar. 1986).

(Continued)

*Primary Examiner*—Dao L. Phan
(74) *Attorney, Agent, or Firm*—RatnerPrestia

(57) ABSTRACT

A radio-wave arrival-direction apparatus calculates a correlation matrix of received signals by correlation calculation between antenna elements, and calculates a noise spatial eigenmatrix, of which each row or column is an eigenvector belonging to a noise eigen-space, by eigenvalue factorization of the correlation matrix. The apparatus also factorizes a matrix including a product of the noise spatial eigenmatrix and a conjugated and transposed matrix of it to an upper or lower triangular matrix, using cholesky factorization. The apparatus calculates an angle evaluation value in a predetermined angle range of an arrival-angle evaluation function using the derived upper or lower triangular matrix, and determines an arrival angle based on the calculation result. A calculation amount in a variable angle range can be thus reduced without causing accuracy degradation of arrival direction, in an algorism requiring all angle sweep for arrival angle estimation of MUSIC method or the like.

9 Claims, 18 Drawing Sheets

OTHER PUBLICATIONS

Wax et al., "Detection of Signals by Information Theoretic Criteria," IEEE Trans., vol. ASSP–33, No. 2, pp. 387–392 (Apr. 1985).

Pillal et al., "Forward/Backward Spatial Smoothing Techniques For Coherent Signal Identification," IEEE Trans., vol. 37, No. 1, pp. 8–15 (Jan. 1989).

Haardt et al., "Unitary ESPRIT: How To Obtain Increased Estimation Accuracy with a Reduced Computational Burden," IEEE Trans., vol. 43, No. 5, pp. 1232–1242 (May 1995).

Capon, J., "High–Resolution Frequency–Wavenumber Spectrum Analysis," Proceedings of the IEEE, vol. 57, No. 8, pp. 1408–1418 (Aug. 1969).

Kendall, David G., "Smoothing Periodograms from Time–Series with Continuous Spectra," Nature, vol. 161, No. 4096, pp. 686–687 (May 1948).

Karimi et al., "A Novel and Efficient Solution to Block–Based Joint–Detection Using Approximate Cholesky Factorization," IEEE Trans., vol. 3, pp. 1340–1345, 1998.

European Search Report for Application No. EP 01 12 9227.3, dated Jul. 16, 2002.

* cited by examiner

RADIO-WAVE ARRIVAL-DIRECTION ESTIMATING APPARATUS AND DIRECTIONAL VARIABLE TRANSCEIVER

This application a continuation of patent application Ser. No. 10/635,411, filed Aug. 6, 2003, now U.S. Pat. No. 6,836,245 which is a divisional of application Ser. No. 10/020,477, filed Dec. 12, 2001, now U.S. Pat. No. 6,642,888, issued Nov. 4, 2003.

FIELD OF THE INVENTION

The present invention relates to a radio-wave arrival-direction estimating apparatus employing an array antenna, and a directivity variable transceiver for varying antenna directivity based on an estimation result from the estimating apparatus.

BACKGROUND OF THE INVENTION

An arrival direction of radio wave is conventionally estimated accurately in a method such as Multiple Signal Classification (MUSIC) method, using an array antenna comprising a plurality of antenna elements. The MUSIC method is disposed in R. O. Schmidt, "Multiple Emitter Location and Signal Parameter Estimation", Institute of Electrical and Electronics Engineers (IEEE) Trans., AP-34, pp. 276–280 (1986). This method includes an algorism for accurately estimating a direction of a plurality of incident waves with the same frequency band.

In this method, M (>1) antenna elements receive signals, and a receiving unit connected to each antenna element converts the frequency of each of the received signals, detects a phase of it, and demodulates the received signal to a signal comprising orthogonal I and Q signals. An analog/digital converter (A/D converter) converts the demodulated signal to sampling data and outputs the data to a direction estimating processor. The direction estimating processor estimates a direction of the incident waves using the sampling data by the MUSIC method. In other words, using sampling data $x_1(k), x_2(k), \ldots, x_M(k)$ at sampling time $k\Delta T$ obtained by respective antenna elements, a correlation matrix calculation unit creates receiving vector x (k) written as $$x(k)=[x_1(k)x_2(k) \ldots x_M(k)] \quad \text{(Equation 1)},$$

where T shows transposition of a vector, $\Delta T$ is a sampling interval, and k is a natural number. The correlation matrix calculation unit, using receiving vectors x (k) for k=1 to N, further finds M×M correlation matrix R written as $$R = \sum_{k=1}^{N} x(k)x(k)^H /N, \quad \text{(Equation 2)}$$

where H shows complex conjugate transposition of a vector.

The calculation unit calculates eigenvalues $\lambda_1-\lambda_M$ of correlation matrix R in the descending order, and eigenvactors $e_1-e_M$ corresponding to eigenvalues $\lambda_1-\lambda_M$.

Next, the calculation unit calculates an evaluation value of an arrival-angle evaluation function, assuming number of the incident waves is S, and using noise spatial eigenmatrix $E_N=[e_{S+1}, \ldots, e_M]$ and a feature that signal eigenvector space $E_S=[e_1, \ldots, e_S]$ and $E_N$ are orthogonal to each other.

This $E_N$ is formed with (M–S) eigenvactors, namely column vectors, belonging to a noise eigenvactor space having the relation written as $$\lambda_1 \geq \lambda_2 \geq \ldots \geq \lambda_s > \lambda_{s+1}=\lambda_{s+2}= \ldots =\lambda_M \quad \text{(Equation 3)},$$

and $E_S$ is formed with eigenvactors $e_1-e_S$. In other words, arrival-angle evaluation function $F(\theta)$ for evaluating orthogonality between $E_N$ and $E_S$ is defined by $$F(\theta) = \frac{1}{a^H(\theta)E_N E_N^H a(\theta)}, \quad \text{(Equation 4)}$$

where $a(\theta)$ is a complex response (hereinafter called a steering, vector) of the array antenna as a function of azimuth $\theta$. Azimuth $\theta$ varies in a predetermined angle range. When azimuth $\theta$ equals to the arrival angle, ideally, arrival-angle evaluation function $F(\theta)$ is infinite. A resultant peak direction of $F(\theta)$ from calculation for the varied $\theta$ is set to be the arrival-angle evaluation value of the incident waves.

Number S of incident waves is generally unknown, so that the number is determined based on an eigenvalue distribution and number-of-signal determination criteria. The criteria is described in M. Wax and T. Kailath, "Detection of Signals by Information Theoretic Criteria", IEEE Trans. On Acoustics, Speech and Signal, Processing, Vol. ASSP 33 (2), pp. 387–392, February (1985).

The radio-wave arrival-direction estimating apparatus employing the MUSIC method discussed above estimates an arrival direction accurately by signal processing, using an algorithm of deriving eigenvalue of a correlation matrix of array received signals. In such an estimating apparatus, correlation between waves generated by reflection on the ground or a building increases when a relative delay time between these waves is shorter than a symbol length. In this case, correlation matrix R degrades, and therefore the incident waves cannot be precisely separated.

For preventing the degradation, a spatial smoothing technique is proposed. This spatial smoothing technique is described in Pillai et al, "Forward/Backward Spatial Smoothing Techniques for Coherent Signal Identification", IEEE Trans. On Acoustics, Speech and Signal Processing, Vol. 37, No. 1, 1989. The example has estimated the arrival direction using spatial samples from the array antenna; however the MUSIC method can be similarly applied to a signal sampled every frequency and the delay time of the received waves can be estimated at high resolution.

The estimation accuracy of the arrival direction in the MUSIC method depends on variation step $\Delta\theta$ of $\theta$ in the arrival-angle evaluation function (Eq.4). When $\Delta\theta$ increases, a calculation amount in the entire variation range of $\theta$ decreases, but the peak direction of the arrival-angle evaluation function cannot accurately detect the peak direction and the accuracy decreases. When $\Delta\theta$ decreases, the peak direction of the arrival-angle evaluation function can be accurately detected, but a calculation amount in the entire variation range of $\theta$ increases.

SUMMARY OF THE INVENTION

It is an object of the present invention to provide a radio-wave arrival-direction estimating apparatus allowing reduction of a total calculation amount for an arrival-angle evaluation function without causing accuracy degradation of the arrival direction. It is another object of the present invention to provide a directivity variable transceiver for improving transmitting and receiving quality by controlling antenna directivity.

In the present invention, product of a noise spatial eigenmatrix and a conjugated and transposed matrix of it is a product of an upper or lower triangular matrix. Therefore, the calculation amount for the arrival-angle evaluation function can be reduced in the entire angle range for the estimation of the arrival direction. The arrival angle evaluation using the arrival-angle evaluation function that has a heavy calculation load can be significantly reduced during angle sweeping in the MUSIC method. Processing of the arrival-direction estimating apparatus can be speeded or an apparatus structure can be simplified.

BRIEF DESCRIPTION OF THE DRAWINGS

FIG. 11 is a block diagram of a direction estimating processor in accordance with exemplary embodiment 9 of the present invention.

DESCRIPTION OF THE EXEMPLARY EMBODIMENTS

Exemplary embodiments of the present invention are demonstrated hereinafter with reference to the accompanying drawings.

1. First Exemplary Embodiment

Figure 1:
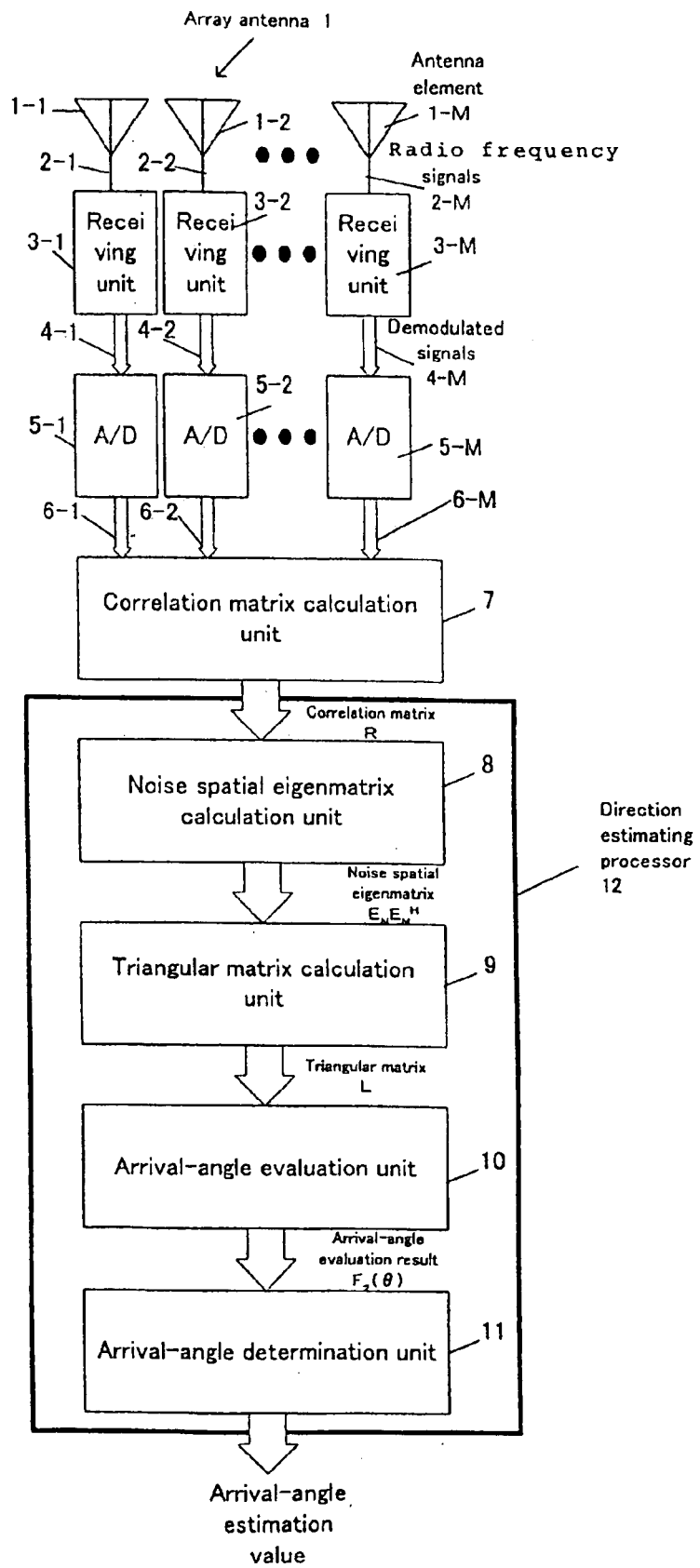
FIG. 1 is a block diagram of a radio-wave arrival-direction estimating apparatus in accordance with exemplary embodiment 1 of the present invention.

FIG. 1 is a block diagram of a radio-wave arrival-direction estimating apparatus in accordance with exemplary embodiment 1 of the present invention. Array antenna 1 comprises M(>1) antenna elements 1-1 to 1-M. Antenna elements 1-1 to 1-M receive radio frequency (RF) signals 2-1 to 2-M. Receiving units 3-1 to 3-M connected to antenna elements 1-1 to 1-M convert frequency of the signals and demodulate the converted signals to signals 4-1 to 4-M comprising orthogonal I signal and Q signal. A/D converters 5-1 to 5-M sample respective I signals and Q signals of the demodulated signals 4-1 to 4-M, and convert the demodulated signals to complex digital signals 6-1 to 6-M. Each of the complex digital signals has the I signal in its real part and the Q signal in its imaginary part.

Correlation matrix calculation unit 7 creates receiving vector x(k) given by Eq.1, using complex digital signals $x_1(k), x_2(k), \ldots, x_M(k)$ at sampling time $k\Delta T$ derived from complex digital signals 6-1 to 6-M. Here k is a natural number and $\Delta T$ is a sampling interval. Correlation matrix calculation unit 7 further derives M×M correlation matrix R written by Eq.2 using receiving vectors x(k) accumulated for N sampling periods.

Noise spatial eigenmatrix calculation unit 8 applies eigenvalue factorization to derived correlation matrix R to derive eigenvalues $\lambda_1-\lambda_M$ in the descending order and eigenvactors $e_1-e_M$ corresponding to them. When a number of the incident waves is S, calculation unit 8 outputs noise spatial eigenmatrix $E_N=[e_{S+1}, \ldots, e_M]$ comprising (M−S) eigenvactors, namely column vectors, belonging to a noise partial space having the relation given by Eq.3.

Triangular matrix calculation unit 9 derives product U of a noise spatial eigenmatrix and a conjugated and transposed matrix of it as in, $$U = E_N E_N^H \quad \text{(Equation 5).}$$

Because matrix U is an M×M positive definite matrix, triangular matrix calculation unit 9, using cholesky factorization, derives lower triangular matrix L written as $$U = LL^H \quad \text{(Equation 6).}$$

Arrival-angle evaluation unit 10 evaluates an arrival angle every predetermined angle step $\Delta\theta$ using the evaluation function $$F_2(\theta) = \frac{1}{a^H(\theta) L L^H a(\theta)} \quad \text{(Equation 7)}$$
$$= \frac{1}{\|L^H a(\theta)\|^2},$$

where, $\|x\|$ is the norm of vector x, and $a(\theta)$ is a normalized steering vector of the array antenna. This evaluation function (Eq.7) is derived from the arrival-angle evaluation function written as Eq.4 using lower triangular matrix L. Since elements outside the lower triangular part in lower triangular matrix L are null, a ratio of a sum-of-product calculation amount for the arrival-angle evaluation function given by Eq.7 to that in Eq.4 is (M+3)/[2(M−S+1)]. The calculation amount for the function given by Eq.7 can be therefore reduced if number S of incident waves satisfies S<(M−1)/2.

Figure 2:
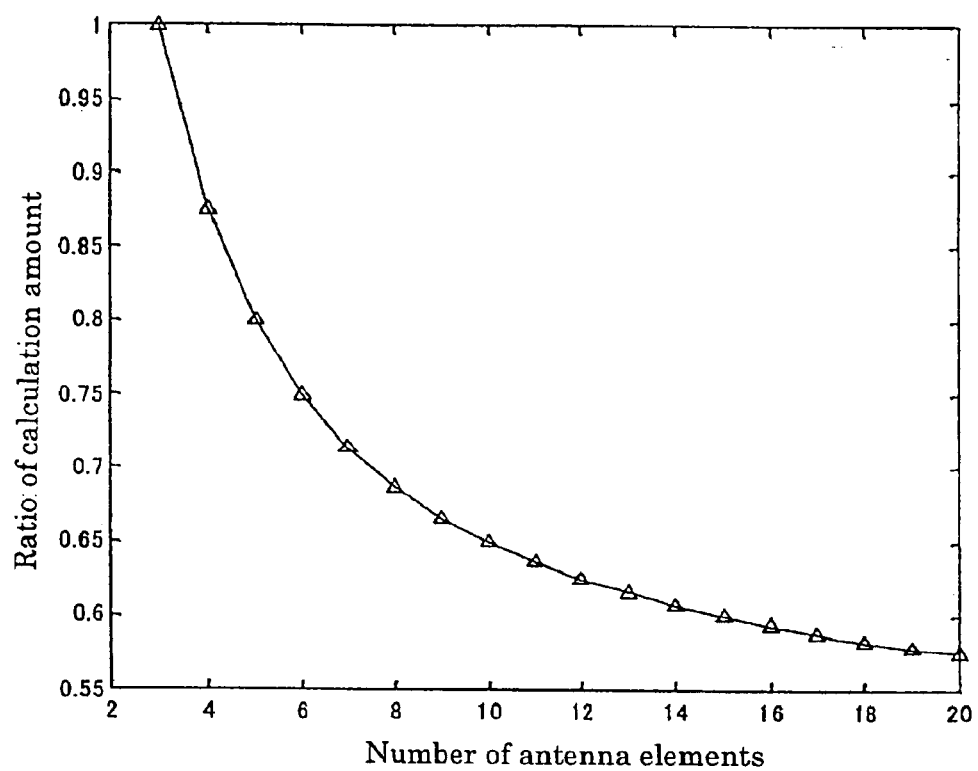
FIG. 2 is a graph illustrating reduction of a calculation amount in accordance with exemplary embodiment 1.

Referring now to FIG. 2 there is shown a ratio of the calculation amount for the arrival-angle evaluation function given by Eq.7 to that by Eq.4 when number S is 1. FIG. 2 shows that a reduced calculation amount in Eq.7 in this method increases as the number of antenna elements increases. For example, when the number of antenna elements is 6, the calculation amount is about 75% of that in the prior art.

Figure 3:
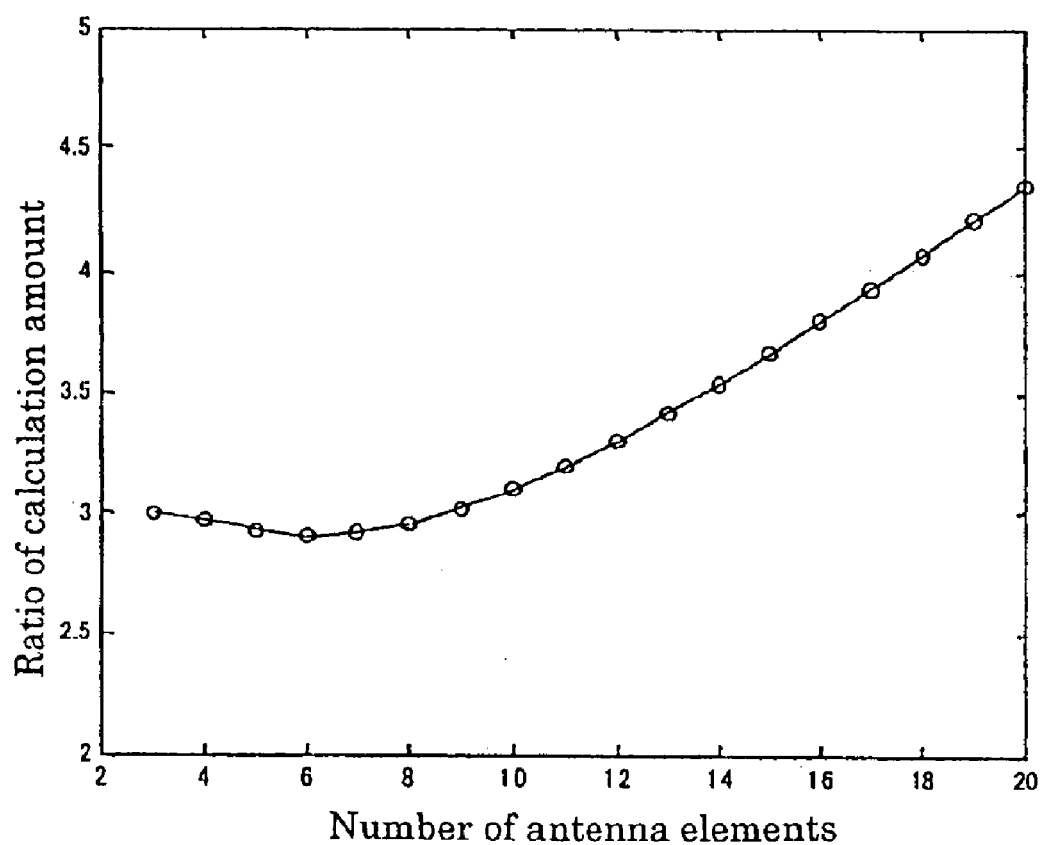
FIG. 3 is a graph illustrating a calculation amount required for cholesky factorization in accordance with exemplary embodiment 1.

Referring now to FIG. 3 there is shown a ratio of the calculation amount for the cholesky factorization to the calculation amount for arrival-angle evaluation function $F(\theta_i)$ for one arrival angle $\theta_i$ in Eq.4. FIG. 3 shows that the calculation amount for the cholesky factorization does not reach the calculation amount for arrival-angle evaluation function for five arrival angles even if the number of antenna elements is 20. The arrival angle evaluation is usually performed for more than 5 arrival angles, so that the increase of the calculation amount for the cholesky factorization can be considered extremely smaller than that for the arrival angle evaluation in the entire range of the angle sweep in Eq.7.

Arrival-angle determination unit 11 detects a peak direction based on an arrival-angle evaluation result every $\Delta\theta$ in a variable range of $\theta$, and uses the detected direction as an arrival-angle estimation value of the incident waves.

In the present embodiment, triangular matrix calculation unit 9 applies the cholesky factorization to product U of the noise spatial eigenmatrix and the conjugated and transposed matrix of it to derive lower triangular matrix L. Arrival-angle evaluation function $F_2(\theta)$ is derived by equivalent conversion of the arrival-angle evaluation function written as Eq.4 using matrix L. Additionally, using function $F_2(\theta)$, the calculation amount for the arrival angle evaluation can be reduced under the condition S<(M−1)/2.

The direction estimation using the MUSIC method has been discussed above. However, the method of the present embodiment can be as-is applied to a received signal sampled every frequency when the delay time of the received wave is estimated at high resolution. That is because an evaluation function similar to that in Eq.4 is used.

The lower triangular matrix is derived by the cholesky factorization in Eq.6; however, an upper triangular matrix also obviously produces a similar advantage.

Triangular matrix calculation unit 9, using a modified cholesky factorization, may find lower triangular matrix L and diagonal matrix D expressed as $$U = LDL^H \qquad \text{(Equation 8)}.$$

The modified cholesky factorization does not require the square root calculation, so that calculation time can be reduced.

In this case, arrival-angle evaluation function $F_2(\theta)$ is expressed as $$F_2(\theta) = \frac{1}{\sum_{k=1}^{M} \frac{b_k^2}{d_k}}, \qquad \text{(Equation 9)}$$

where $b_k$ and $d_k$ are vector elements given by $$b = \begin{pmatrix} b_1 \\ b_2 \\ \vdots \\ b_M \end{pmatrix} = L^H a(\theta) \qquad \text{(Equation 10)}$$

and $$D = \begin{pmatrix} d_1 & 0 & \cdots & 0 \\ 0 & d_2 & \ddots & \vdots \\ \vdots & \ddots & \ddots & 0 \\ 0 & \cdots & 0 & d_M \end{pmatrix}, \qquad \text{(Equation 11)}$$

respectively. The lower triangular matrix has been used in the present embodiment; however, an upper triangular matrix also obviously produces a similar advantage.

Additionally, correlation matrix calculation unit 7 may apply a spatial smoothing technique to the correlation matrix in order to suppress correlation wave. The method in the present embodiment can be similarly applied in this case if the spatially smoothed correlation matrix instead of correlation matrix R is fed into direction estimating processor 12.

An example of an array antenna having a constant-interval linear array shape is described in M. Haardt and J. A. Nossek, "Unitary ESPRIT: How to Obtain Increased Estimation Accuracy with a Reduced Commutational Burden," IEEE Trans. Signal Processing, vol. 43, No. 5, pp. 1232–1242 (1995). In this example, thanks to the conjugation center symmetry of a phase of a steering vector, the steering vector can be converted into a real vector using unitary matrix $Q_M$ written as $$b(\theta) = Q_M^H a(\theta) \qquad \text{Equation 12,}$$

where $a(\theta)$ is a steering vector when the phase center matches with the array center.

A method similar to the method in the present embodiment can be applied to this case, if direction estimating processor 12 uses the real part of $Q_M^H R Q_M$ instead of correlation matrix R, and $b(\theta)$ instead of steering vector $a(\theta)$.

When an array antenna having a linear array shape is employed, estimation accuracy in the end fire direction decreases. Therefore, arrival-angle evaluation unit 10 sets the angle interval in the end fire direction of the array antenna to be larger than that in the bore-sight direction, and calculates an evaluation value of the arrival-angle evaluation function. The calculation amount can be thus reduced. Here the bore-sight direction means the direction of the normal to the linear array arrangement direction.

A configuration may be employed that comprises, instead of receiving units 3 and A/D converters 5 in the present embodiment, the following components:

intermediate frequency (IF) receiving units for converting frequencies and detecting phases of RF signals supplied from respective antenna elements 1-1 to 1-M and outputting IF signals;

IF A/D converters for converting the IF signals to digital signals; and digital orthogonal wave detectors for orthogonally demodulating the digital signals and supplying complex digital signals to the correlation matrix calculation unit.

2. Second Exemplary Embodiment

Figure 4:
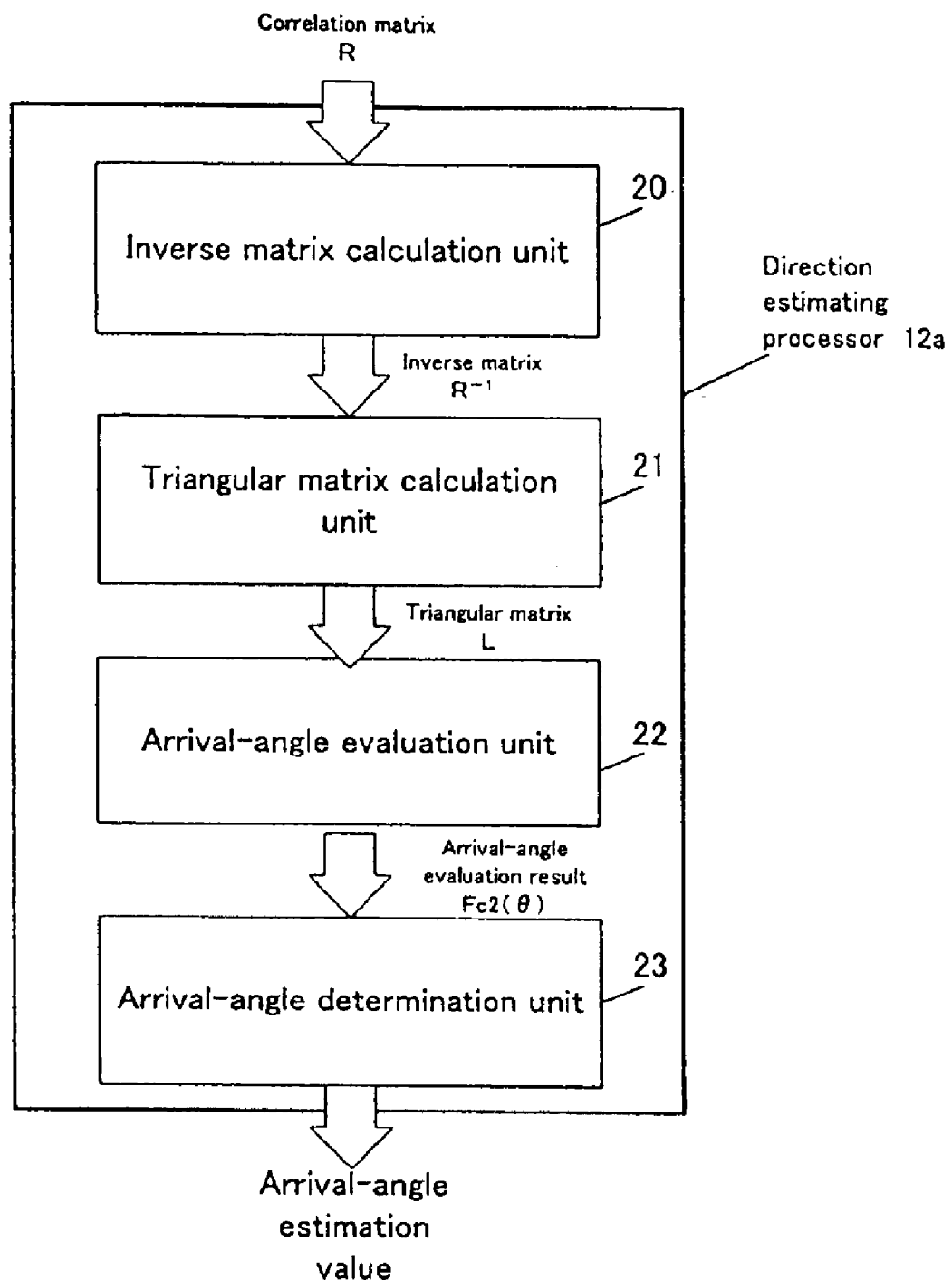
FIG. 4 is a block diagram of a direction estimating processor in accordance with exemplary embodiment 2 of the present invention.

FIG. 4 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

Operations until correlation matrix R is fed into direction estimating processor 12a are similar to those in embodiment 1. Inverse matrix calculation unit 20 calculates inverse matrix $R^{-1}$ of correlation matrix R. Because inverse matrix $R^{-1}$ is a positive definite matrix, triangular matrix calculation unit 21 derives lower triangular matrix L written as $$R^{-1} = LL^H \qquad \text{(Equation 13)},$$

using the cholesky factorization.

Using lower triangular matrix L, arrival-angle evaluation unit 22 converts a conventional arrival-angle evaluation function obtained by Capon method as given by $$Fc(\theta) = \frac{1}{a^H(\theta) R^{-1} a(\theta)}, \qquad \text{(Equation 14)}$$

to an evaluation function $$Fc_2(\theta) = \frac{1}{\|L^H a(\theta)\|^2}, \qquad \text{(Equation 15)}$$

where, $\|x\|$ is the norm of vector x, and $a(\theta)$ is a normalized steering vector of the array antenna. Arrival-angle evaluation unit 22 then evaluates an arrival angle every predetermined angle step $\Delta\theta$ using the evaluation function given by Eq.15. Here, the arrival-angle evaluation function given by Eq.14 is described in J. Capon, "High-Resolution Frequency-Wavenumber Spectrum Analysis." Proc. IEEE, 57 (8), pp. 1408–1418, 1969.

Since elements outside the lower triangular part in lower triangular matrix L are null, the sum-of-product calculation amount for the arrival-angle evaluation function given by Eq.15 is ratio (M+3)/[2(M+1)] lower than that for the conventional arrival-angle evaluation function given by Eq.14. A relation between the calculation amount for the cholesky factorization and that of $Fc_2(\theta_i)$ for one arrival angle $\theta_i$ given by Eq.15 is similar to that given by embodiment 1. Therefore, an increment of the calculation amount caused by the cholesky factorization can be considered sufficiently smaller than a decrement of the calculation amount for the arrival-angle evaluation in the entire angle range in Eq.15.

Arrival-angle determination unit 23 detects a peak direction based on an arrival-angle evaluation result every $\Delta\theta$ in a variable range of $\theta$, and uses the detected direction as an arrival-angle estimation value of the incident waves.

In the present embodiment, using arrival-angle evaluation function $Fc_2(\theta)$ (Eq.15), the calculation amount in the arrival-angle evaluation can be reduced compared with the arrival-angle evaluation function (Eq.14) by the Capon method. Function $Fc_2(\theta)$ has been derived by equivalent conversion of the arrival-angle evaluation function given by Eq.14, using lower triangular matrix L determined in triangular matrix calculation unit 21 by applying the cholesky factorization to inverse matrix $R^{-1}$ of the correlation matrix.

The direction estimation based on the Capon method has been discussed above. However, the method of the present embodiment can be as-is applied to a received signal sampled every frequency when the delay time of the received wave is estimated at high resolution. That is because an evaluation function similar to that in Eq.14 is used.

Additionally, correlation matrix calculation unit 7 can apply a spatial smoothing technique to the correlation matrix in order to suppress correlation wave. The method of the present embodiment can be similarly applied to this case, if the spatially smoothed correlation matrix instead of correlation matrix R is fed into the direction estimating processor.

When an array antenna having the constant-interval linear array shape is employed, a steering vector can be converted into a real vector using unitary matrix $Q_M$ given by Eq.12, thanks to the conjugation center symmetry of the phase of the steering vector. In Eq.12, $a(\theta)$ is a steering vector when the phase center matches with the array center. A method similar to the method in the present embodiment can be applied to this case, if direction estimating processor 12a uses the real part of $Q_M^H R Q_M$ instead of correlation matrix R, and $b(\theta)$ instead of steering vector $a(\theta)$.

When an array antenna having the linear array shape is employed, estimation accuracy in the bore-sight direction decreases. Therefore, arrival-angle evaluation unit 22 sets the angle interval in the end file direction of the array antenna to be larger than that in the bore-sight direction, and calculates an evaluation value of the arrival-angle evaluation function. The calculation amount can be thus reduced.

Additionally, triangular matrix calculation unit 21 may derive lower triangular matrix L and diagonal matrix D using the modified cholesky factorization. The modified cholesky factorization does not require the square root calculation, so that the calculation time can be reduced.

3. Third Exemplary Embodiment

Figure 5:
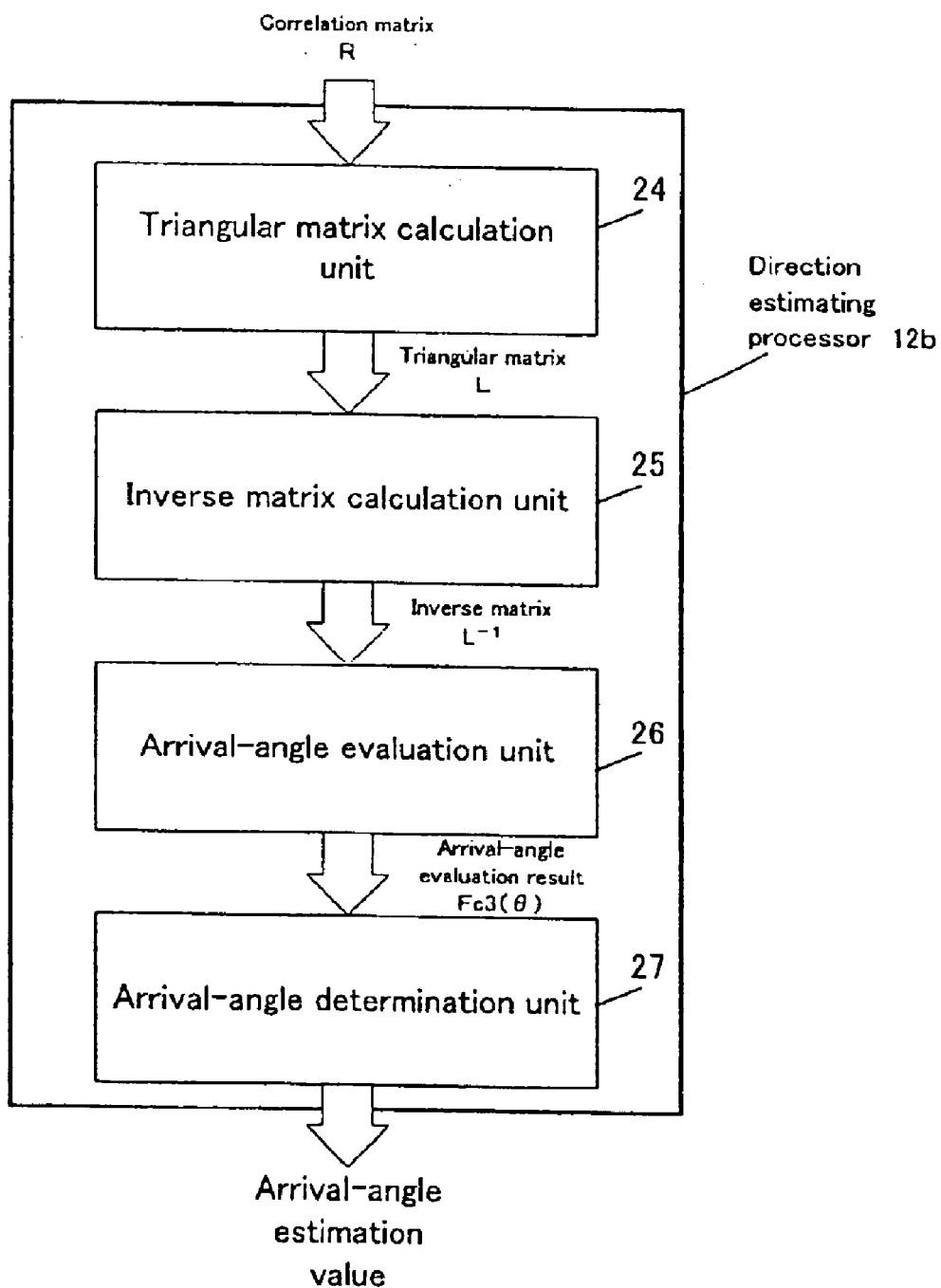
FIG. 5 is a block diagram of a direction estimating processor in accordance with exemplary embodiment 3 of the present invention.

FIG. 5 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

Operations until correlation matrix R are fed into direction estimating processor 12b are similar to those in embodiment 1.

Since correlation matrix R is a positive definite matrix, triangular matrix calculation unit 24 derives lower triangular matrix L given by $$R = LL^H \qquad \text{(Equation 16)},$$

using the cholesky factorization.

Inverse matrix calculation unit 25 calculates inverse matrix $L^{-1}$ of lower triangular matrix L.

Using lower triangular matrix L, arrival-angle evaluation unit 26 converts the arrival-angle evaluation function (Eq.14) derived by the Capon method to an evaluation function $Fc_3(\theta)$ expressed as $$Fc_3(\theta) = \frac{1}{\|L^{-1} a(\theta)\|^2}, \qquad \text{(Equation 17)}$$

where, $\|x\|$ is the norm of vector x, and $a(\theta)$ is a normalized steering vector of the array antenna. Arrival-angle evaluation unit 26 then evaluates an arrival angle every predetermined angle step $\Delta\theta$ using the evaluation function of $Fc_3(\theta)$.

Since elements outside the lower triangular part in lower triangular matrix L are null, the sum-of-product calculation amount for the arrival-angle evaluation function given by Eq.17 is ratio (M+3)/[2(M+1)] lower than that for the Capon method's conventional arrival-angle evaluation function (Eq.14). A relation between the calculation amount (Eq.16) for the cholesky factorization and that of $Fc_2(\theta_i)$ per arrival angle $\theta_i$ is similar to that shown in embodiment 1. Therefore, an increment of the calculation amount caused by the cholesky factorization can be considered sufficiently smaller than a decrement of the calculation amount for the arrival-angle evaluation in the entire angle range in Eq.17.

Arrival-angle determination unit 27 detects a peak direction based on an arrival-angle evaluation result every $\Delta\theta$ in a variable range of $\theta$, and uses the detected direction as an arrival-angle estimation value of the incident waves.

In the present embodiment, using arrival-angle evaluation function $Fc_3(\theta)$ (Eq.17), the calculation amount in the arrival-angle evaluation can be significantly reduced compared with the conventional arrival-angle evaluation function (Eq.14) by the Capon method. Function $Fc_3(\theta)$ has been derived by equivalent conversion of the arrival-angle evaluation function given by Eq.14, using lower triangular matrix L determined in triangular matrix calculation unit 24 by applying the cholesky factorization to correlation matrix R.

The direction estimation based on the Capon method has been discussed above. However, the method of the present embodiment can be as-is applied to a received signal sampled every frequency when the delay time of the received wave is estimated at high resolution. That is because an evaluation function similar to that in Eq.14 is used.

Additionally, correlation matrix calculation unit 7 can apply a spatial smoothing technique to the correlation matrix in order to suppress correlation wave. The method of the present embodiment can be similarly applied to this case, if the spatially smoothed correlation matrix instead of correlation matrix R is fed into the direction estimating processor.

When an array antenna having the constant-interval linear array shape is employed, a steering vector can be converted into a real vector using unitary matrix $Q_M$ given by Eq.12, thanks to the conjugation center symmetry of the phase of the steering vector. In Eq.12, $a(\theta)$ is a steering vector when the phase center matches with the array center. A method similar to the method in the present embodiment can be applied to this case, if direction estimating processor 12b uses the real part of $Q_M{}^H R Q_M$ instead of correlation matrix R, and $b(\theta)$ instead of steering vector $a(\theta)$.

When an array antenna having the linear array shape is employed, estimation accuracy in the bore-sight direction decreases. Therefore, arrival-angle evaluation unit 22 sets the angle interval in the end fire direction of the array antenna to be larger than that in the bore-sight direction, and calculates an evaluation value of the arrival-angle evaluation function. The calculation amount can be thus reduced.

Additionally, triangular matrix calculation unit 24, using the modified cholesky factorization, may derive lower triangular matrix L and diagonal matrix D given by $$R = LDL^H \quad \text{(Equation 18)}.$$

The modified cholesky factorization does not require the square root calculation, so that the calculation time can be reduced.

An arrival-angle evaluation function in this case is expressed as $$Fc_3(\theta) = \frac{1}{\sum_{k=1}^{M} \frac{b_k^2}{d_k}}, \quad \text{(Equation 19)}$$

where $b_k$ and $d_k$ are vector elements given by $$b = \begin{pmatrix} b_1 \\ b_2 \\ \vdots \\ b_M \end{pmatrix} = L^{-1} a(\theta) \quad \text{(Equation 20)}$$

and $$D = \begin{pmatrix} d_1 & 0 & \cdots & 0 \\ 0 & d_2 & \ddots & \vdots \\ \vdots & \ddots & \ddots & 0 \\ 0 & \cdots & 0 & d_M \end{pmatrix}, \quad \text{(Equation 21)}$$

respectively. The lower triangular matrix has been used in the present embodiment; however, an upper triangular matrix also obviously produces a similar advantage.

4. Fourth Exemplary Embodiment

Figure 6:
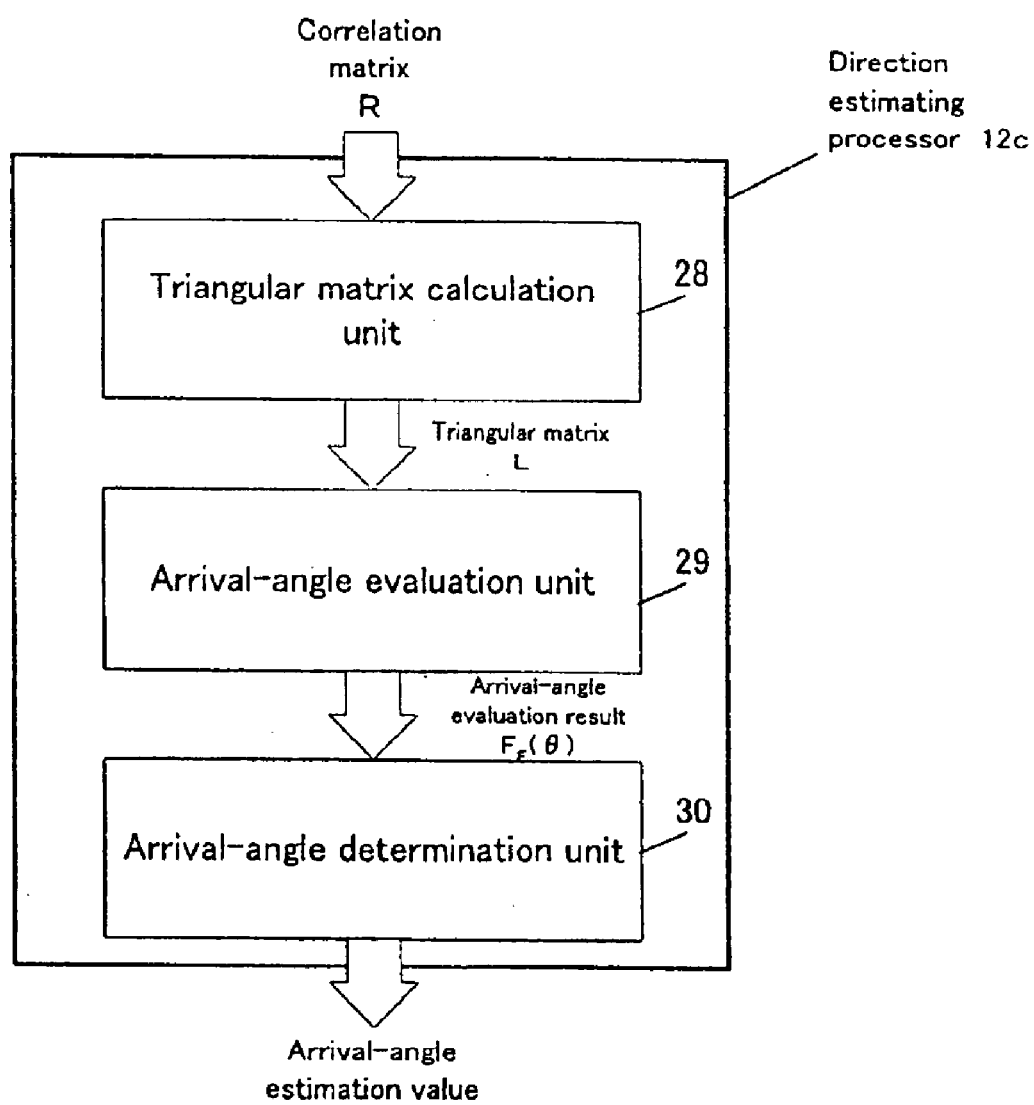
FIG. 6 is a block diagram of a direction estimating processor in accordance with exemplary embodiment 4 of the present invention.

FIG. 6 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

Operations until correlation matrix R are fed into direction estimating processor 12c is similar to those in embodiment 1.

Since correlation matrix R is a positive definite matrix, triangular matrix calculation unit 28, using the cholesky factorization, derives lower triangular matrix L given by $$R = LL^H \quad \text{(Equation 22)}.$$

Using lower triangular matrix L, arrival-angle evaluation unit 29 converts conventional arrival-angle evaluation function $F_F(\theta)$ obtained by Fourier method as given by $$F_F(\theta) = a^H(\theta) R a(\theta) \quad \text{(Equation 23)},$$

to an evaluation function expressed as $$F_{F2}(\theta) = \|L^H a(\theta)\|^2 \quad \text{(Equation 24)},$$

where, $\|x\|$ is the norm of vector x, and $a(\theta)$ is a normalized steering vector of the array antenna. Arrival-angle evaluation unit 29 then evaluates an arrival angle every predetermined angle step $\Delta\theta$ using the evaluation function given by Eq.24. Here, the arrival-angle evaluation function given by Eq.23 is described in M. S. Bartlett. "Smoothing Periodograms from Time Series with Continuous Spectra." Nature, 161, pp. 686–687, (1948).

Since elements outside the lower triangular part in lower triangular matrix L are null, the sum-of-product calculation amount for the arrival-angle evaluation function given by Eq.24 is ratio (M+3)/[2(M+1)] lower than that for the conventional arrival-angle evaluation function given by Eq.23. An increment of the calculation amount caused by the cholesky factorization is sufficiently smaller than a decrement of the calculation amount for the arrival-angle evaluation in the entire angle range in Eq.24. That is because the relation between the calculation amounts in the present embodiment is also similar to that shown in embodiment 1.

Arrival-angle determination unit 30 detects a peak direction based on an arrival-angle evaluation result every $\Delta\theta$ in a variable range of $\theta$, and uses the detected direction as an arrival-angle estimation value of the incident waves.

In the present embodiment, using arrival-angle evaluation function $F_{F2}(\theta)$ (Eq.24), the calculation amount in the arrival-angle evaluation can be significantly reduced compared with the conventional arrival-angle evaluation function (Eq.23) by Fourier method. Function $F_{F2}(\theta)$ has been derived by equivalent conversion of the arrival-angle evaluation function given by Eq.23, using lower triangular matrix L determined in the triangular matrix calculation unit by applying the cholesky factorization to the correlation matrix.

Additionally, correlation matrix calculation unit 7 can apply a spatial smoothing technique to the correlation matrix in order to suppress correlation wave. The method of the present embodiment can be similarly applied to this case, if the spatially smoothed correlation matrix instead of correlation matrix R is fed into direction estimating processor 12c.

When an array antenna having the constant-interval linear array shape is employed, a steering vector can be converted into a real vector using unitary matrix $Q_M$ given by Eq.12, thanks to the conjugation center symmetry of the phase of the steering vector. In Eq.12, $a(\theta)$ is a steering vector when the phase center matches with the array center. A method similar to the method in the present embodiment can be applied to this case, if direction estimating processor 12c uses the real part of $Q_M{}^H R Q_M$ instead of correlation matrix R, and $b(\theta)$ instead of steering vector $a(\theta)$.

When an array antenna having the linear array shape is employed, estimation accuracy in the bore-sight direction decreases. Therefore, arrival-angle evaluation unit 30 sets the angle interval in the end fire direction of the array antenna to be larger than that in the bore-sight direction, and calculates an evaluation value of the arrival-angle evaluation function. The calculation amount can be thus reduced.

Additionally, triangular matrix calculation unit 28, using the modified cholesky factorization, may derive lower triangular matrix L and diagonal matrix D given by Eq.18. The modified cholesky factorization does not require the square root calculation, so that the calculation time can be reduced. An arrival-angle evaluation function in this case is expressed as $$F_{F3}(\theta) = \sum_{k=1}^{M} \frac{b_k^2}{d_k},\qquad\text{(Equation 25)}$$

where $b_k$ and $d_k$ are vector elements written as $$b = \begin{pmatrix} b_1 \\ b_2 \\ \vdots \\ b_M \end{pmatrix} = L^H a(\theta) \qquad\text{(Equation 26)}$$

and $$D = \begin{pmatrix} d_1 & 0 & \cdots & 0 \\ 0 & d_2 & \ddots & \vdots \\ \vdots & \ddots & \ddots & 0 \\ 0 & \cdots & 0 & d_M \end{pmatrix},\qquad\text{(Equation 27)}$$

respectively. The lower triangular matrix has been used in the present embodiment; however, an upper triangular matrix also obviously produces a similar advantage.

5. Fifth Exemplary Embodiment

Figure 7:
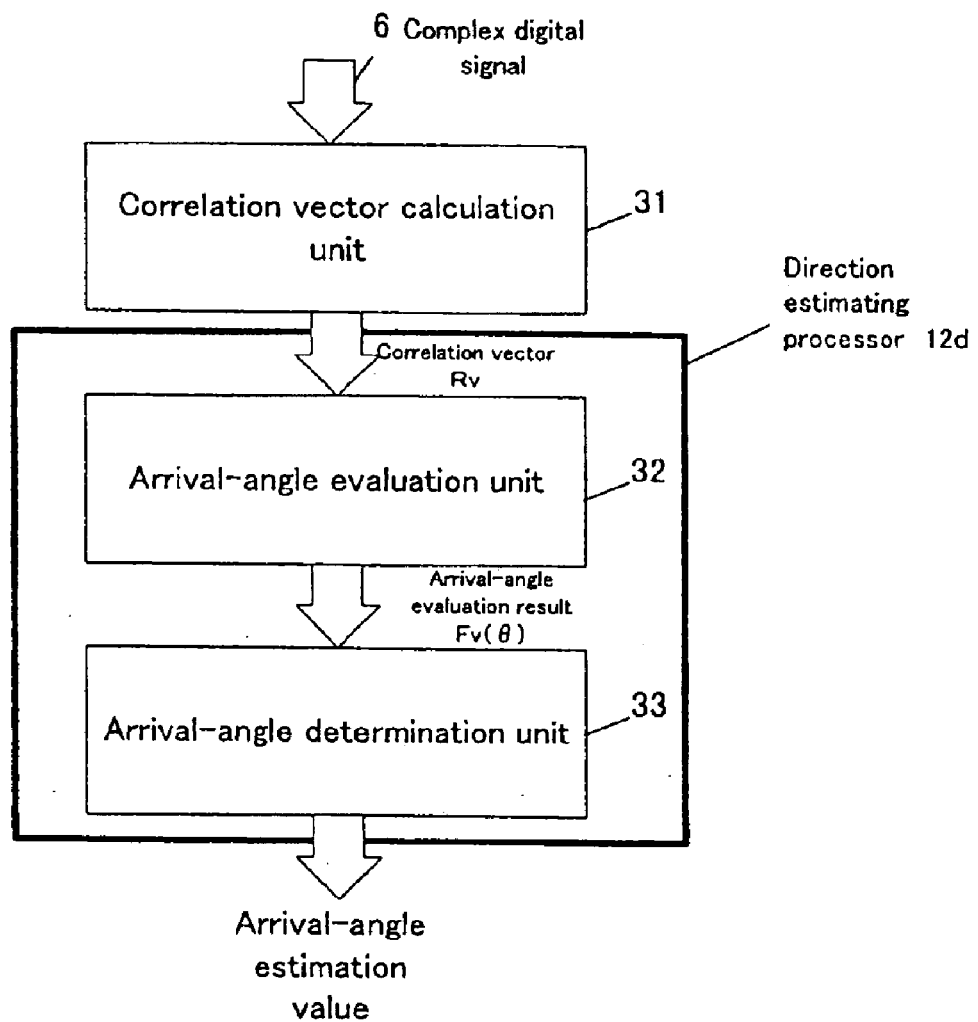
FIG. 7 is a block diagram of a direction estimating processor in accordance with exemplary embodiment 5 of the present invention.

FIG. 7 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

Operations until complex digital signals 6 are obtained are similar to those in embodiment 1.

Correlation vector calculation unit 31 selects one of complex digital signals 6, and performs a correlation calculation between an antenna element—a reference antenna—corresponding to the selected signal and another antenna element, thereby deriving a correlation vector. An example will be described hereinafter employing antenna element 1-1 as the reference antenna. Antenna elements 1-1 to 1-M receive sampling data $x_1(k), x_2(k), \ldots, x_M(k)$ at sampling time $t_0 + k\Delta T$, respectively. Here $t_0$ is an arbitrary time, $\Delta T$ is a sampling interval, and k is a natural number. Correlation vector calculation unit 31, using snapshot data of the sampling data for $k=1$ to N, derives M-dimensional correlation vector Rv expressed as $$R_v = \frac{1}{N}\sum_{k=1}^{N} x_1(k)^* x^T(k),\qquad\text{(Equation 28)}$$

where asterisk * shows complex conjugate.

Arrival-angle evaluation unit 32 evaluates an arrival angle every predetermined angle step $\Delta\theta$ using the evaluation function given by $$F_v(\theta) = \|R_v{}^H a(\theta)\|\qquad\text{(Equation 29)},$$

where, $\|x\|$ is the norm of vector x, and $a(\theta)$ is a normalized steering vector of the array antenna.

Arrival-angle determination unit 33 detects a peak direction based on an arrival-angle evaluation result every $\Delta\theta$ in a variable range of $\theta$, and uses the detected direction as an arrival-angle estimation value of the incident waves.

The arrival angle is evaluated using the correlation vector instead of the correlation matrix in the present embodiment, so that the calculation amount in the arrival-angle evaluation can be significantly reduced compared with the conventional Fourier method (Eq.23).

When an array antenna having the linear array shape is employed, estimation accuracy in the bore-sight direction decreases. Therefore, arrival-angle evaluation unit 32 sets the angle interval in the end fire direction of the array antenna to be larger than that in the bore-sight direction, and calculates an evaluation value of the arrival-angle evaluation function. The calculation amount can be thus reduced.

6. Sixth Exemplary Embodiment

Figure 8:
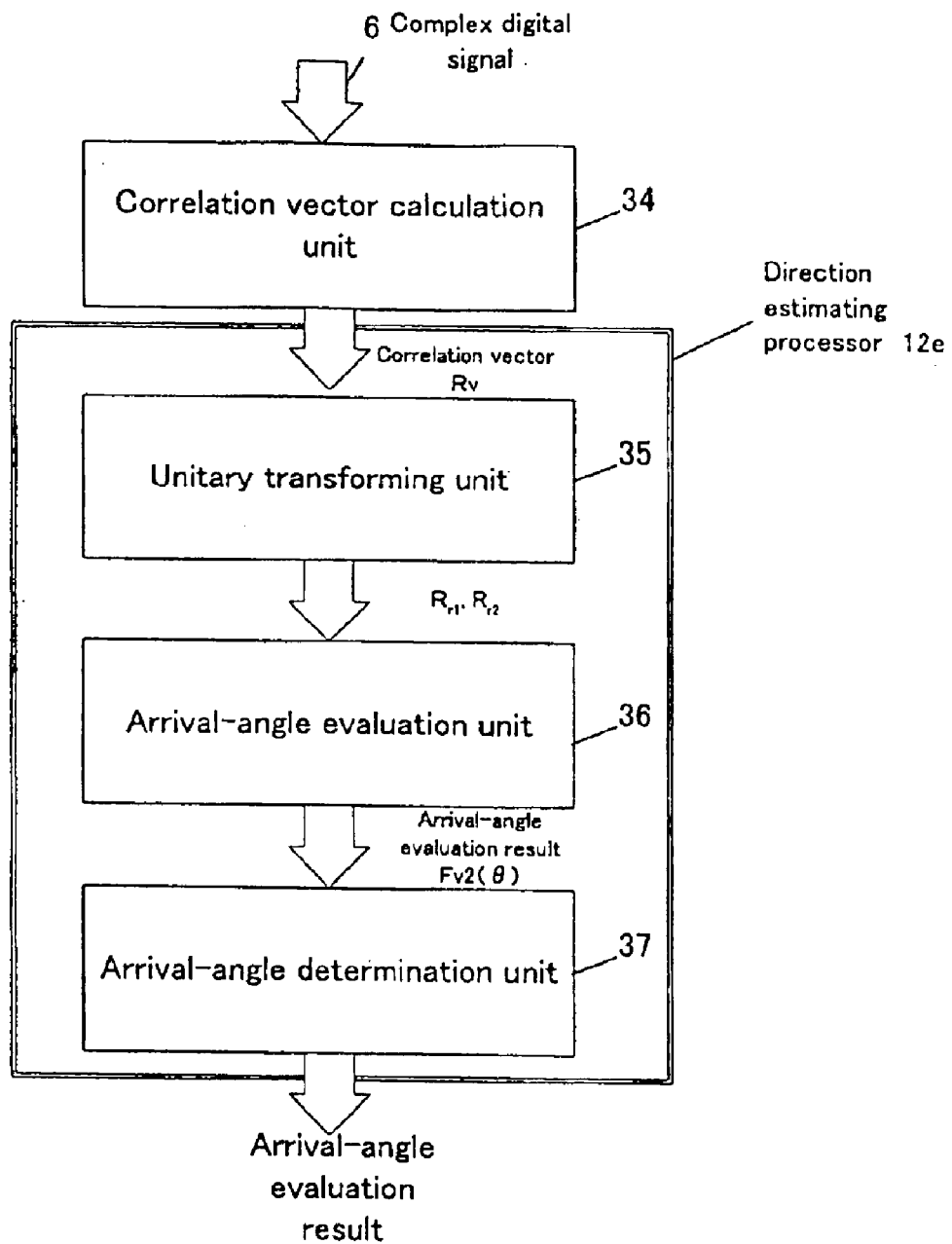
FIG. 8 is a block diagram of a direction estimating processor in accordance with exemplary embodiment 6 of the present invention.

FIG. 8 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter. The present embodiment employs an array antenna having the constant-interval linear array shape.

Operations until complex digital signals 6 are obtained are similar to those in embodiment 1. Correlation vector calculation unit 34 selects one of complex digital signals 6, and performs a correlation calculation between an antenna element—a reference antenna—corresponding to the selected signal and another antenna element, thereby deriving a correlation vector. An example will be described hereinafter employing antenna element 1-1 as the reference antenna. Antenna elements 1-1 to 1-M receive sampling data $x_1(k), x_2(k), \ldots, x_M(k)$ at sampling time $t_0+k\Delta T$, respectively. Here $t_0$ is an arbitrary time, $\Delta T$ is a sampling interval, and k is a natural number. Correlation vector calculation unit 34, using snapshot data of the sampling data for k=1 to N, derives M-dimensional correlation vector Rv expressed as Eq.28. In Eq.28, asterisk * shows complex conjugate.

Since the array antenna has the constant-interval linear array shape, a steering vector can be converted into a real vector using unitary matrix $Q_M$ given by Eq.12, thanks to the conjugation center symmetry of the phase of the steering vector. In Eq.12, a(θ) is a steering vector when the phase center matches with the array center. Unitary transforming unit 35 unitary-transforms correlation vector Rv as in $$R_{r1} = \text{real}(q'_{1,1} R v Q_M) \quad \text{(Equation 30)},$$

$$R_{r2} = \text{real}(q^*_{1,m} R v Q_M) \quad \text{(Equation 31)},$$

where $q_{ij}$ is (i, j) element of matrix $Q_M$, real (x) is a vector comprising real parts of respective elements of vector x, and m is M/2+1 for even M (number of elements), or m is (M+1)/2+1 for odd M.

Arrival-angle evaluation unit 36 evaluates an arrival angle every predetermined angle step Δθ using the evaluation function given by $$F_{v2}(\theta) = [b_1(\theta) R_{r1} + b_m(\theta) R_{r2}] b(\theta) \quad \text{(Equation 32)},$$

where, real steering vector b(θ) is converted from steering vector a(θ) using Eq.12, and $b_k(\theta)$ is the k-th element of real steering vector b(θ).

Arrival-angle determination unit 37 detects a peak direction based on an arrival-angle evaluation result every Δθ in a variable range of θ, and uses the detected direction as an arrival-angle estimation value of the incident waves.

The arrival angle is evaluated using the correlation vector instead of the correlation matrix and using the real steering vector in the present embodiment, so that the calculation amount in the arrival-angle evaluation can be significantly reduced compared with the conventional Fourier method (Eq.23).

When an array antenna having the linear array shape is employed, estimation accuracy in the bore-sight direction decreases. Therefore, arrival-angle evaluation unit 37 sets the angle interval in the end fire direction of the array antenna to be larger than that in the bore-sight direction, and calculates an evaluation value of the arrival-angle evaluation function. The calculation amount can be thus reduced.

7. Seventh Exemplary Embodiment

Figure 9:
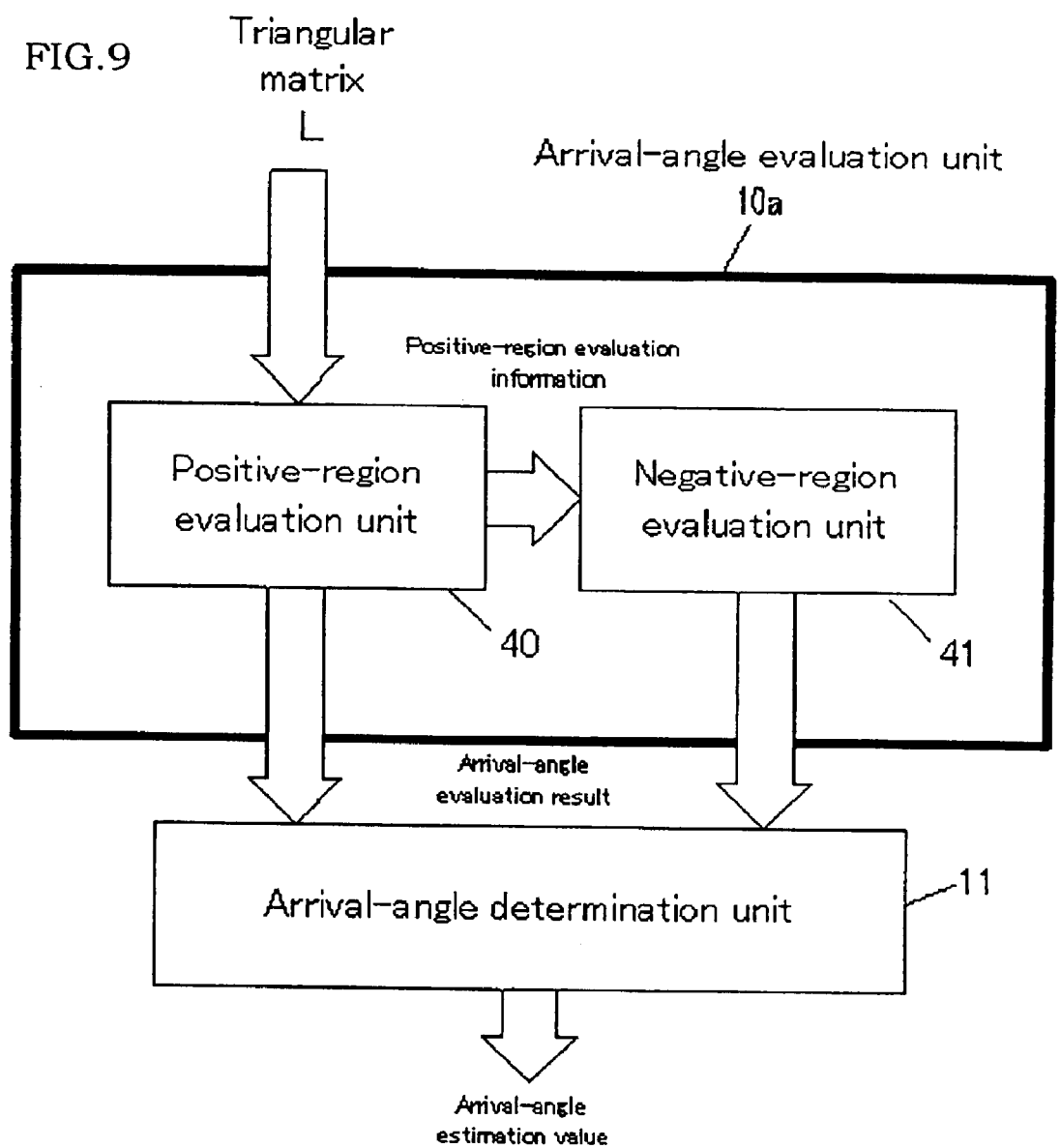
FIG. 9 is a block diagram of a direction estimating processor in accordance with exemplary embodiment 7 of the present invention.

FIG. 9 is a block diagram illustrating the other configuration of arrival-angle evaluation unit 10 of the radio-wave arrival-direction estimating apparatus of the present invention. Components other than the arrival-angle evaluation unit in the radio-wave arrival-direction estimating apparatus are similar to those in embodiment 1 described in FIG. 1, so that diagrams and descriptions of these components are omitted. Components different from embodiment 1 will be mainly described hereinafter.

The present embodiment assumes that antenna elements 1-1 to 1-M of array antenna 1 are arranged linearly at a constant interval. Operations until triangular matrix L is fed into arrival-angle evaluation unit 10a are similar to those in embodiment 1.

Arrival-angle evaluation unit 10a comprises the following components:

positive-region evaluation unit 40 for calculating an arrival-angle evaluation function in the positive angle region (0°≤θ≤90°) using the bore-sight direction of the array antenna as an angle reference (θ=0), because the array antenna has the constant-interval linear array shape; and negative-region evaluation unit 41 for converting the evaluation result of the positive-region evaluation unit to an arrival-angle evaluation value in the negative angle region (−90°≤θ≤0°).

Since the array antenna has the constant-interval linear array shape, steering vector a(θ) is a complex vector expressed as $$a(\theta) = \begin{bmatrix} \exp\{-j2\pi d \cdot 0 \cdot \sin\theta/\lambda\} \\ \exp\{-j2\pi d \cdot 1 \cdot \sin\theta/\lambda\} \\ \vdots \\ \exp\{-j2\pi d \cdot (M-1) \cdot \sin\theta/\lambda\} \end{bmatrix} \quad \text{(Equation 33)}$$

The real part of the complex vector is an even function of θ, and the imaginary part is an odd function of θ. Using this feature, Eq.7 can be transformed to $$F_2(\pm\theta_l) = [\|L^H a(\pm\theta_l)\|]^{-2} \quad \text{(Equation 34)}$$

$$= [\|(\text{Re}(L^H) + j\,\text{Im}(L^H)) \cdot$$

$$(\text{Re}(a(\theta_l)) \pm j\,\text{Im}(a(\theta_l)))\|]^{-2}$$

$$= [\|(\text{Re}(L^H) \cdot \text{Re}(a(\theta_l)) \mp \text{Im}(L^H) \cdot \text{Im}(a(\theta_l))\|^2 -$$

$$\|\text{Im}(L^H) \cdot \text{Re}(a(\theta_l)) \pm \text{Re}(L^H) \cdot \text{Im}(a(\theta_l))\|^2]^{-1}$$

$$= [\|c1 \mp c2\|^2 - \|c3 \pm c4\|^2]^{-1},$$

for $\theta_1$ satisfying 0°≤$\theta_1$≤90°. Here, Re(x) is a vector comprising real parts of respective elements of the complex vector (or matrix) x, Im(x) is a vector comprising imaginary parts of them, d is an interval of antenna elements, λ is a wavelength of carrier frequency, and vectors c1, c2, c3, c4 are given by $$c1 = \text{Re}(L^H) \cdot \text{Re}(a(\theta_1)) \quad \text{(Equation 35)},$$

$$c2 = \text{Im}(L^H) \cdot \text{Im}(a(\theta_1)) \quad \text{(Equation 36)},$$

$$c3 = \text{Im}(L^H) \cdot \text{Re}(a(\theta_1)) \quad \text{(Equation 37)},$$

and $$c4 = \text{Re}(L^H) \cdot \text{Im}(a(\theta_1)) \quad \text{(Equation 38)},$$

respectively.

Positive-region evaluation unit 40 calculates an arrival-angle evaluation function in the positive angle region ($0° \leq \theta \leq 90°$) at predetermined angle step $\Delta\theta$ using the relation discussed above. Positive-region evaluation unit 40 firstly calculates vectors c1, c2, c3, c4, and then derives a positive-region arrival-angle evaluation value in accordance with $$F3(\theta_1) = [\|c1-c2\|^2 - \|c3+c4\|^2]^{-1} \quad \text{(Equation 39)}.$$

Evaluation unit 40 outputs resultant values of vectors c1, c2, c3, c4 to negative-region evaluation converter 41.

Negative-region evaluation converter 41 calculates an arrival-angle evaluation value in the $-\theta_1$ direction using vectors c1, c2, c3, c4 supplied from evaluation unit 40 in accordance with $$F4(-\theta_1) = [\|c1+c2\|^2 - \|c3-c4\|^2 2]^{-1} \quad \text{(Equation 40)}.$$

Arrival-angle determination unit 11 detects a peak direction based on an arrival-angle evaluation result of arrival-angle evaluation unit 10a every $\Delta\theta$ in a variable range of $\theta$, and uses the detected direction as an arrival-angle estimation value of the incident waves.

In the present embodiment, the positive-region arrival-angle evaluation value can be converted to the negative-region arrival-angle evaluation value using vectors c1, c2, c3, c4, when the array antenna having the constant-interval linear array shape is employed. Here the vectors c1, c2, c3, c4 are calculated when the positive-region arrival-angle evaluation value is derived. The calculation amount in the arrival-angle evaluation can be further reduced substantially in half.

The present embodiment has been described using the arrival-angle evaluation function given by Eq.7 in embodiment 1. When an array antenna having the constant-interval linear array shape is employed, a similar transformation can be also applied to the arrival-angle evaluation function using steering vector $a(\theta)$ in the other embodiment. The conversion to the negative-region arrival-angle evaluation value is allowed using vectors c1, c2, c3, c4 calculated when the positive-region arrival-angle evaluation value are derived, as discussed above. The calculation amount in the arrival-angle evaluation can be reduced substantially in half compared with the conventional method.

8. Eighth Exemplary Embodiment

Figure 10:
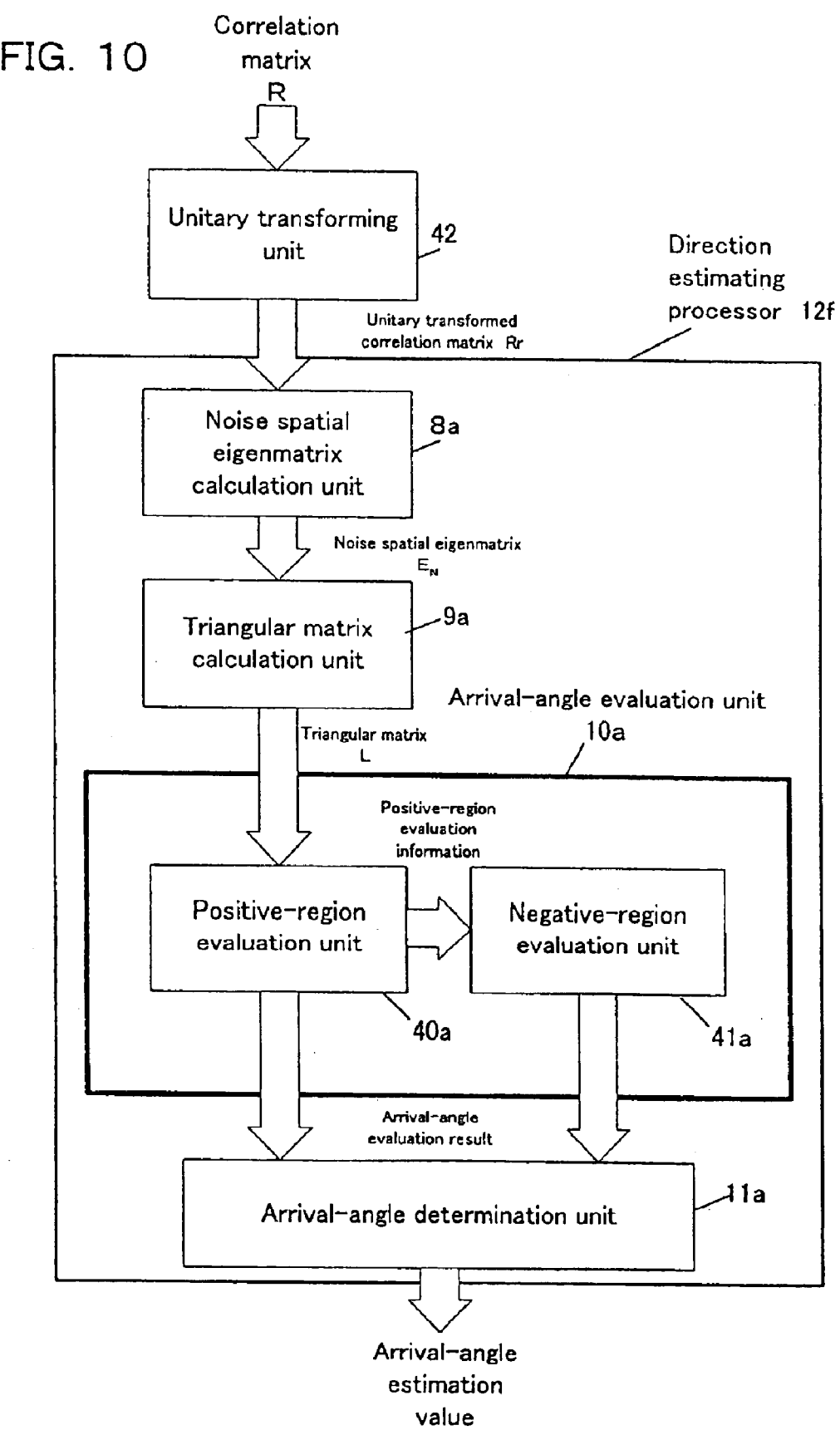
FIG. 10 is a block diagram of a direction estimating processor in accordance with exemplary embodiment 8 of the present invention.
Figure 1:
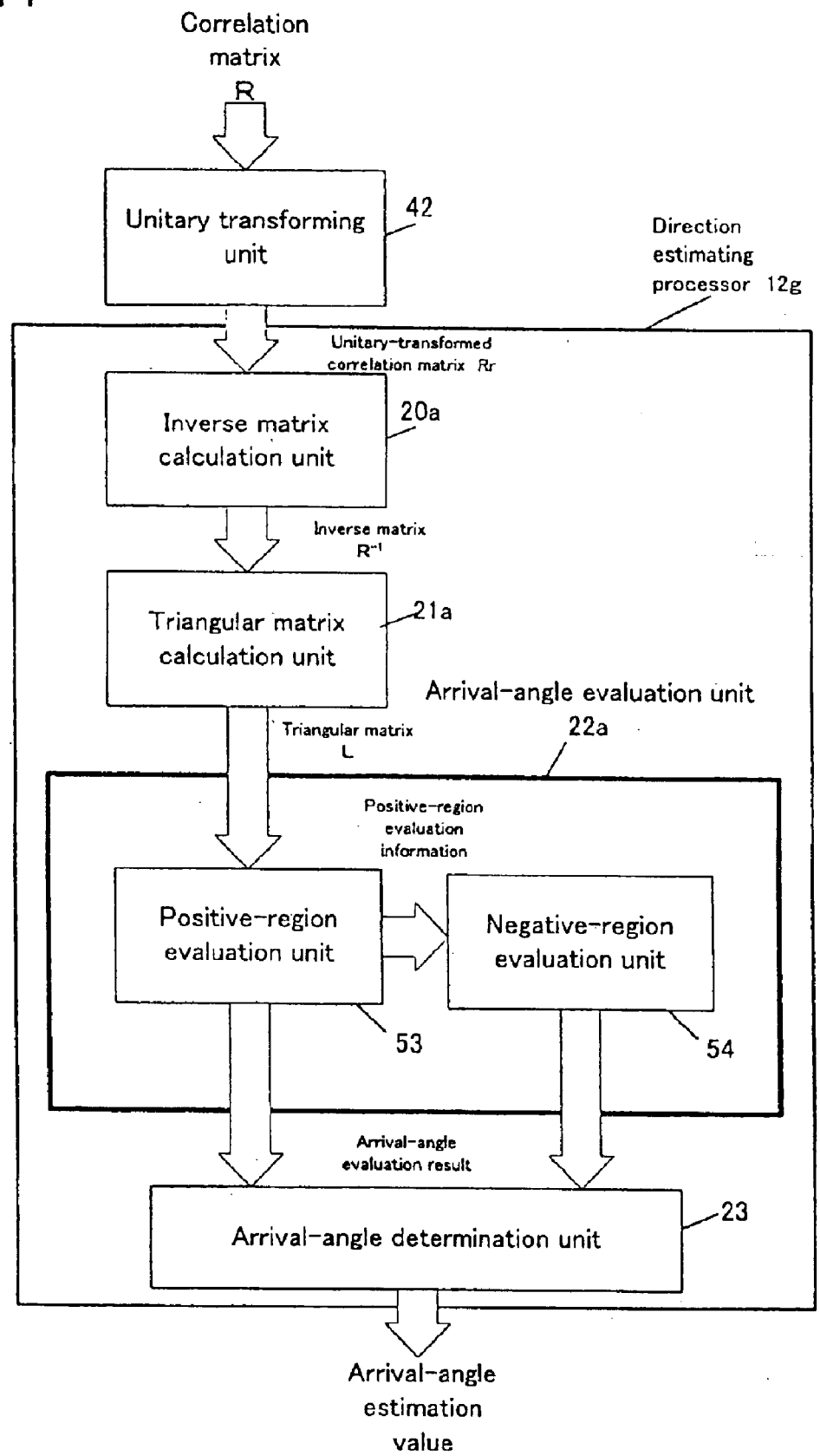

FIG. 10 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

The present embodiment assumes that antenna elements 1-1 to 1-M of array antenna 1 are arranged linearly at a constant interval. Operations until correlation matrix calculation unit 7 outputs correlation matrix R are similar to those in embodiment 1.

Unitary transforming unit 42 transforms correlation matrix R as given by $$Rr = \text{real}(Q_M^H R Q_M) \quad \text{(Equation 41)},$$

using unitary matrix $Q_M$ for converting a steering vector employing the phase center as the array center to a real vector. Here real(A) is a matrix comprising real parts of respective elements of matrix A.

Noise spatial eigenmatrix calculation unit 8a applies the eigenvalue factorization to unitary-transformed correlation matrix Rr by unitary transforming unit 42 to derive eigenvalues $\lambda_1$–$\lambda_M$ in the descending order and eigenvactors $e_1$–$e_M$ corresponding to them. When a number of the incident waves is S, calculation unit 8a outputs noise spatial eigenmatrix $E_N = [e_{S+1}, \ldots, e_M]$ comprising (M−S) eigenvactors, namely column vectors, belonging to a noise partial space having the relation given by Eq.3.

Triangular matrix calculation unit 9a derives product U of a noise spatial eigenmatrix and a complex-conjugated and transposed matrix of it as in Eq.5. Triangular matrix calculation unit 9a derives lower triangular matrix L given by Eq.6 using the cholesky factorization, because matrix U is an M×M positive definite matrix.

Arrival-angle evaluation unit 10a comprises the following components:

- positive-region evaluation unit 40a for calculating the arrival-angle evaluation function in the positive angle region ($0° \leq \theta \leq 90°$) using the bore-sight direction of the array antenna as an angle reference. ($\theta = 0$), because the array antenna has the constant-interval linear array shape; and
- negative-region evaluation unit 41a for converting the evaluation result of the positive-region evaluation unit to an arrival-angle evaluation value in the negative angle region ($-90° \leq \theta \leq 0°$).

When steering vector $a(\theta)$ employing the phase center as the array center is converted using unitary matrix $Q_M$, real vector $b(\theta)$ is derived as in $$b(\theta) = \sqrt{2}\left[\cos\left(\frac{M-1}{2}\mu\right), \ldots, \cos(\mu), \right. \quad \text{(Equation 42)}$$
$$\left. -\sin\left(\frac{M-1}{2}\mu\right), \ldots, -\sin(\mu)\right]^T,$$
for $M = 2m$ or $$b(\theta) = \sqrt{2}\left[\cos\left(\frac{M-1}{2}\mu\right), \ldots, \cos(\mu), \frac{1}{\sqrt{2}}, \right.$$
$$\left. -\sin\left(\frac{M-1}{2}\mu\right), \ldots, -\sin(\mu)\right]^T,$$
for $M = 2m+1$, where $\mu$ is written as $$\mu = -\frac{2\pi}{\lambda}d\sin\theta, \quad \text{(Equation 43)}$$

where, d is an interval between the antenna elements, and $\lambda$ is a wavelength of carrier frequency.

When number M of antenna elements equals 2m, $b(\theta)$ is an even function for elements 1 to m or an odd function for elements m+1 to 2m, as shown in Eq.42. Using this feature, Eq.7 can be transformed to $$F2(\pm\theta_l) = [\|L^H b(\pm\theta_l)\|]^{-2} \quad \text{(Equation 44)}$$
$$= [\|L^H b_{even}(\theta_l) \pm L^H b_{odd}(\theta_l)\|]^{-2}$$
$$= [\|c1 \pm c2\|]^{-2},$$

for $\theta_1$ satisfying $0° \leq \theta_1 \leq 90°$. Here, c1, c2, $b_{even}(\theta)$, and $b_{odd}(\theta)$ are given by $$c1 = L^H b_{even}(\theta_1) \quad \text{(Equation 45)},$$

$$c2 = L^H b_{odd}(\theta_1) \quad \text{(Equation 46)},$$

$$b_{even}(\theta) = \sqrt{2}\left[\cos\left(\frac{M-1}{2}\mu\right), \ldots, \cos(\mu), 0, \ldots, 0\right]^T, \quad \text{(Equation 47)}$$

and $$b_{odd}(\theta) = \sqrt{2}\left[0, \ldots, 0, -\sin\left(\frac{M-1}{2}\mu\right), \ldots, -\sin(\mu)\right]^T, \quad \text{(Equation 48)}$$

respectively.

When number M of antenna elements equals 2m+1, b(θ) is an even function for elements 1 to m, and b(θ) is an odd function for elements m+2 to M. Using this feature, Eq.7 can be transformed to Eq.44, for $\theta_1$ satisfying $0° \leq \theta_1 \leq 90°$. In this case, $b_{even}(\theta)$ and $b_{odd}(\theta)$ are given by $$b_{even}(\theta) = \quad \text{(Equation 49)}$$
$$\sqrt{2}\left[\cos\left(\frac{M-1}{2}\mu\right), \ldots, \cos(\mu), \frac{1}{\sqrt{2}} 0, \ldots, 0\right]^T,$$

and $$b_{odd}(\theta) = \sqrt{2}\left[0, \ldots, 0, -\sin\left(\frac{M-1}{2}\mu\right), \ldots, -\sin(\mu)\right]^T, \quad \text{(Equation 50)}$$

respectively.

Positive-region evaluation unit 40a calculates an arrival-angle evaluation function in the positive angle region ($0° \leq \theta \leq 90°$) at predetermined angle step $\Delta\theta$ using the relation discussed above. Positive-region evaluation unit 40a firstly calculates vectors c1, c2 (Eq.45 and Eq.46) and then derives a positive-region arrival-angle evaluation value in accordance with $$F3(\theta_1) = [\|c1+c2\|^2]^{-1} \quad \text{(Equation 51)}.$$

Evaluation unit 40a outputs resultant values of vectors c1, c2 to negative-region evaluation converter 41a.

Negative-region evaluation converter 41a calculates an arrival-angle evaluation value in the $-\theta_1$ direction using vectors c1, c2 supplied from evaluation unit 40a in accordance with $$F4(-\theta_1) = [\|c1-c2\|^2]^{-1} \quad \text{(Equation 52)}.$$

Arrival-angle determination unit 11a detects a peak direction based on an arrival-angle evaluation result of arrival-angle evaluation unit 10a every $\Delta\theta$ in the variable range of θ, and uses the detected direction as an arrival-angle estimation value of the incident waves.

In the present embodiment, the array antenna having the constant-interval linear array shape has been employed, and the real steering vector has been derived by unitary matrix transformation. The positive-region arrival-angle evaluation value can be converted to the negative-region arrival-angle evaluation value, using vectors c1, c2 calculated when the positive-region arrival-angle evaluation value are derived. The calculation amount in the arrival-angle evaluation can be reduced substantially in half compared with embodiment 1.

9. Nineth Exemplary Embodiment

FIG. 11 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

The present embodiment assumes that antenna elements 1-1 to 1-M of array antenna 1 are arranged linearly at a constant interval. Operations until correlation matrix calculation unit 7 outputs correlation matrix R are similar to those in embodiment 1.

Unitary transforming unit 42 transforms correlation matrix R as given by Eq.41, using unitary matrix $Q_M$ for converting a steering vector employing the phase center as the array center to a real vector. Inverse matrix calculation unit 20a calculates an inverse matrix of unitary-transformed correlation matrix Rr derived by the unitary transforming unit. Triangular matrix calculation unit 21a derives lower triangular matrix L given by Eq.13 using the cholesky factorization. That is because inverse matrix $R^{-1}$ is a positive definite matrix.

Arrival-angle evaluation unit 22a comprises the following components:
- positive-region evaluation unit 53 for calculating an arrival-angle evaluation function in the positive angle region ($0° \leq \theta \leq 90°$) using the bore-sight direction of the array antenna as an angle reference (θ=0), because the array antenna has the constant-interval linear array shape; and
- negative-region evaluation unit 54 for converting the evaluation result of the positive-region evaluation unit to an arrival-angle evaluation value in the negative angle region ($-90° \leq \theta \leq 0°$).

Positive-region evaluation unit 53 calculates an arrival-angle evaluation function in the positive angle region ($0° \leq \theta \leq 90°$) at predetermined angle step $\Delta\theta$. Positive-region evaluation unit 53 firstly calculates vectors c1, c2 given by Eq.45 and Eq.46 for $\theta_1$ satisfying $0° \leq \theta_1 \leq 90°$ and then derives a positive-region arrival-angle evaluation value in accordance with $$F_{C2}(\theta_1) = [\|c1+c2\|^2]^{-1} \quad \text{(Equation 53)}.$$

Evaluation unit 53 outputs resultant values of vectors c1, c2 to negative-region evaluation converter 54.

Negative-region evaluation converter 54 calculates an arrival-angle evaluation value in the $-\theta_1$ direction using vectors c1, c2 supplied from evaluation unit 53 in accordance with $$F_{c2}(-\theta_1) = [\|c1-c2\|^2]^{-1} \quad \text{(Equation 54)}.$$

Arrival-angle determination unit 23 detects a peak direction based on an arrival-angle evaluation result of arrival-angle evaluation unit 22a every $\Delta\theta$ in the variable range of θ, and uses the detected direction as an arrival-angle estimation value of the incident waves.

In the present embodiment, the array antenna having the constant-interval linear array shape has been employed, and the real steering vector has been derived by unitary matrix transformation. The positive-region arrival-angle evaluation value can be converted to the negative-region arrival-angle evaluation value using vectors c1, c2 calculated when the positive-region arrival-angle evaluation value are derived. The calculation amount in the arrival-angle evaluation can be reduced substantially in half compared with embodiment 1.

The present embodiment can be similarly applied to the arrival-angle evaluation function described in embodiment 3.

10. Tenth Exemplary Embodiment

Figure 12:
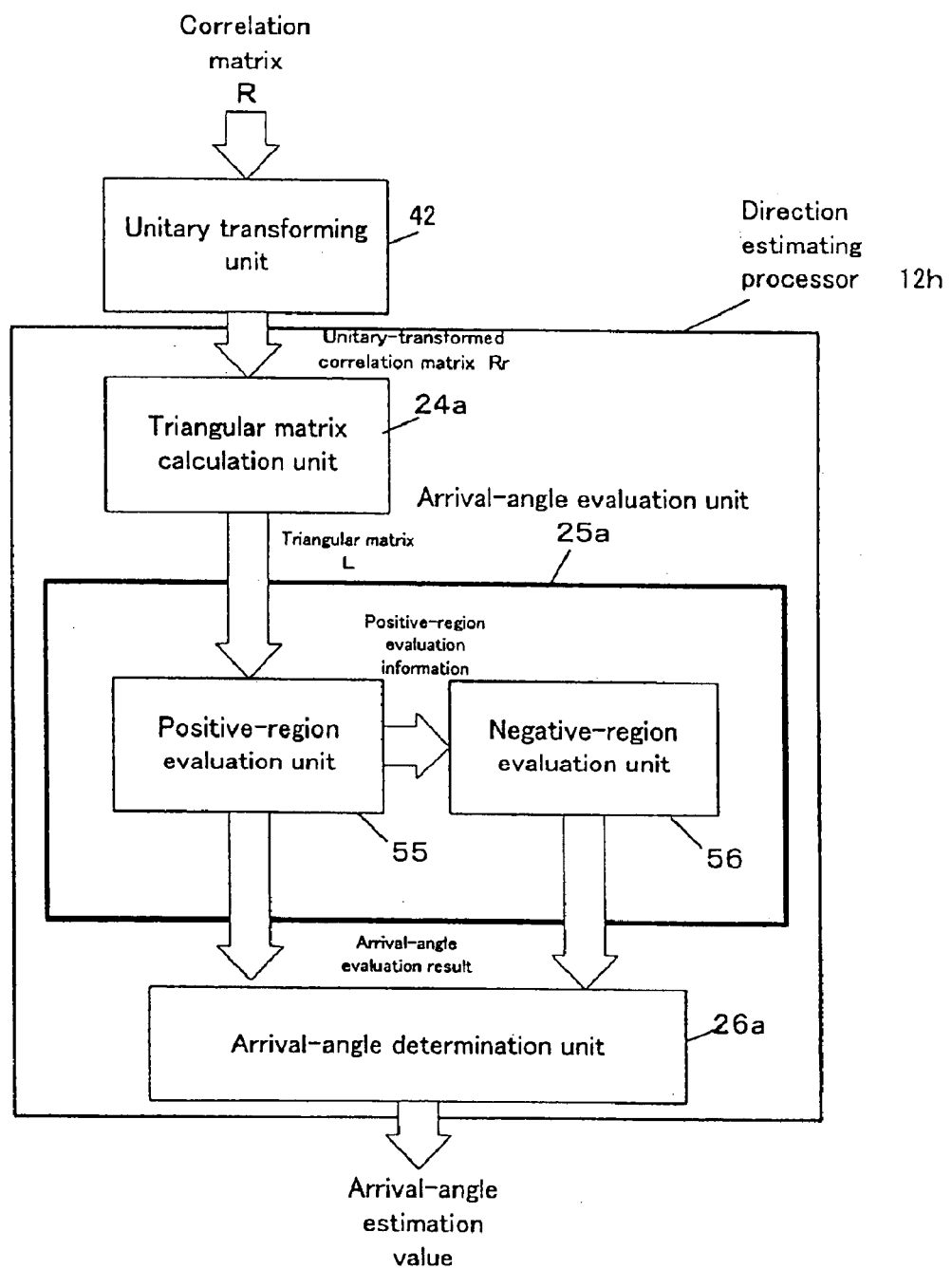
FIG. 12 is a block diagram of a direction estimating processor in accordance with exemplary embodiment 10 of the present invention.

FIG. 12 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

The present embodiment assumes that antenna elements 1-1 to 1-M of array antenna 1 are arranged linearly at a constant interval. Operations until correlation matrix calculation unit 7 outputs correlation matrix R are similar to those in embodiment 1.

Unitary transforming unit 42 transforms correlation matrix R as given by Eq.41, using unitary matrix $Q_M$ for converting a steering vector employing the phase center as the array center to a real vector. Triangular matrix calculation unit 24a derives lower triangular matrix L using the cholesky factorization, because unitary-transformed correlation matrix Rr is a positive definite matrix.

Arrival-angle evaluation unit 25a comprises the following components:

positive-region evaluation unit 55 for calculating an arrival-angle evaluation function in the positive angle region ($0° \leq \theta \leq 90°$) using the bore-sight direction of the array antenna as an angle reference ($\theta=0$), because the array antenna has the linear array shape; and negative-region evaluation unit 56 for converting the evaluation result of the positive-region evaluation unit to an arrival-angle evaluation value in the negative angle region ($-90° \leq \theta \leq 0°$).

Positive-region evaluation unit 55 calculates an arrival-angle evaluation function in the positive angle region ($0° \leq \theta \leq 90°$) at predetermined angle step $\Delta\theta$. Positive-region evaluation unit 55 firstly calculates vectors c1, c2 given by Eq.45 and Eq.46 for $\theta_1$ satisfying $0° \leq \theta_1 \leq 90°$ and then derives a positive-region arrival-angle evaluation value in accordance with $$F_{F2}(\theta_1) = \|c1 + c2\|^2 \quad \text{(Equation 55).}$$

Evaluation unit 55 outputs respective resultant values of vectors c1, c2 to negative-region evaluation converter 56.

Negative-region evaluation converter 56 calculates an arrival-angle evaluation value in the $-\theta_1$ direction using vectors c1, c2 supplied from evaluation unit 55 in accordance with $$F_{F2}(-\theta_1) = \|c1 - c2\|^2 \quad \text{(Equation 56).}$$

Arrival-angle determination unit 26a detects a peak direction based on an arrival-angle evaluation result of arrival-angle evaluation unit 25a every $\Delta\theta$ in the variable range of $\theta$, and uses the detected direction as an arrival-angle estimation value of the incident waves.

In the present embodiment, the array antenna having the constant-interval linear array shape has been employed, and the real steering vector has been derived by unitary matrix transformation. The positive-region arrival-angle evaluation value can be converted to the negative-region arrival-angle evaluation value using vectors c1, c2 calculated when the positive-region arrival-angle evaluation value are derived. The calculation amount in the arrival-angle evaluation can be reduced substantially in half compared with embodiment 1.

The present embodiment can be applied to embodiment 6 by a similar equation transformation.

11. Eleventh Exemplary Embodiment

Figure 13:
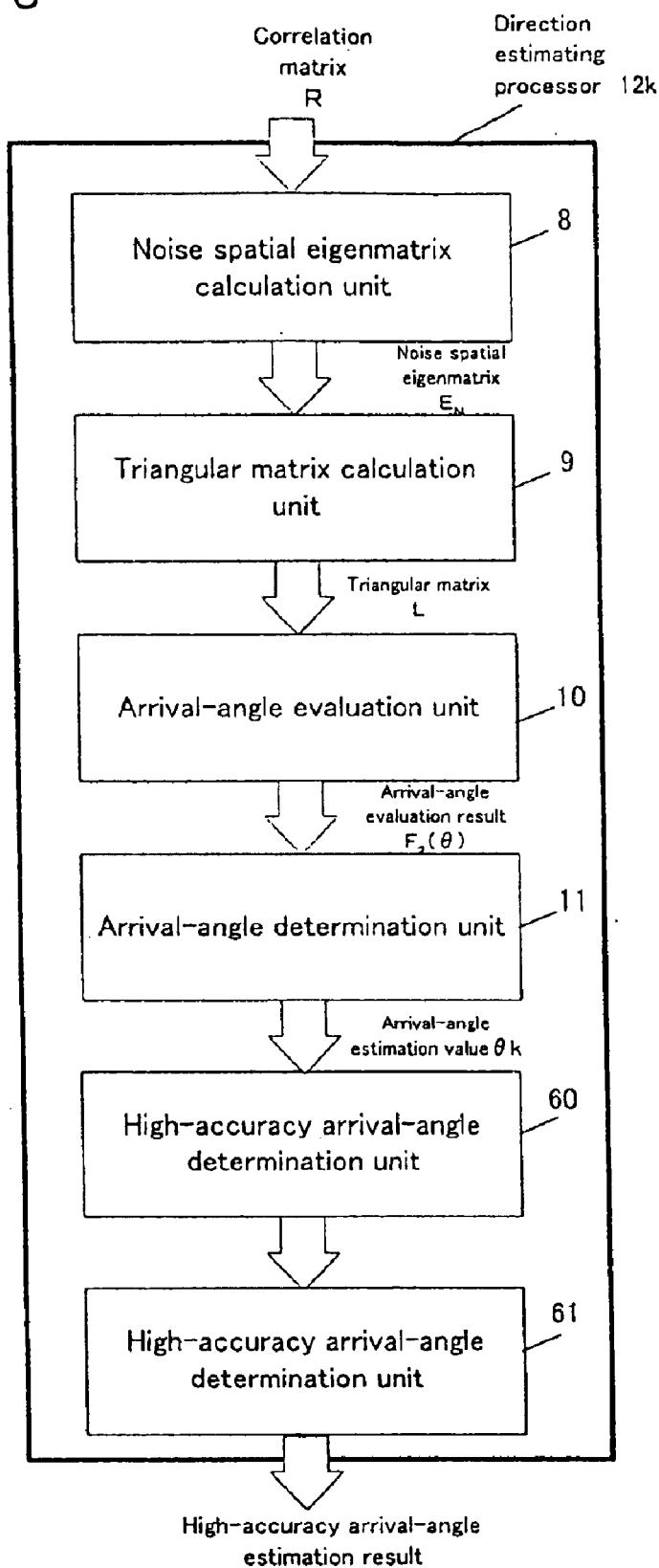
FIG. 13 is a block diagram of a direction estimating processor in accordance with exemplary embodiment 11 of the present invention.

FIG. 13 is a block diagram illustrating the other configuration of direction estimating processor 12 of the radio-wave arrival-direction estimating apparatus of the present invention. Components other than the direction estimating processor in the radio-wave arrival-direction estimating apparatus are similar to those in embodiment 1 described in FIG. 1, so that diagrams and descriptions of these components are omitted. Components different from embodiment 1 will be mainly described hereinafter.

The configuration in the present invention includes the following components, in addition to direction estimating processor 12 shown in FIG. 1:

high-accuracy arrival-angle evaluation unit 60 for calculating an evaluation value of an arrival-angle evaluation function at an angle interval smaller than an angle interval calculated by an arrival-angle evaluation unit; and high-accuracy arrival-angle determination unit 61 for highly accurately determining an arrival angle based on the evaluation value by high-accuracy arrival-angle evaluation unit 60.

The following operations are similar to those in embodiment 1:

correlation matrix R is fed into direction estimating processor 12k;

triangular matrix calculation unit 9 calculates triangular matrix L; and arrival-angle determination unit 11 detects a peak direction based on an arrival-angle evaluation result of arrival-angle evaluation unit 10 every $\Delta\theta$ in a variable range of $\theta$, and uses the detected direction as an arrival-angle estimation value of the incident waves.

Figure 14:
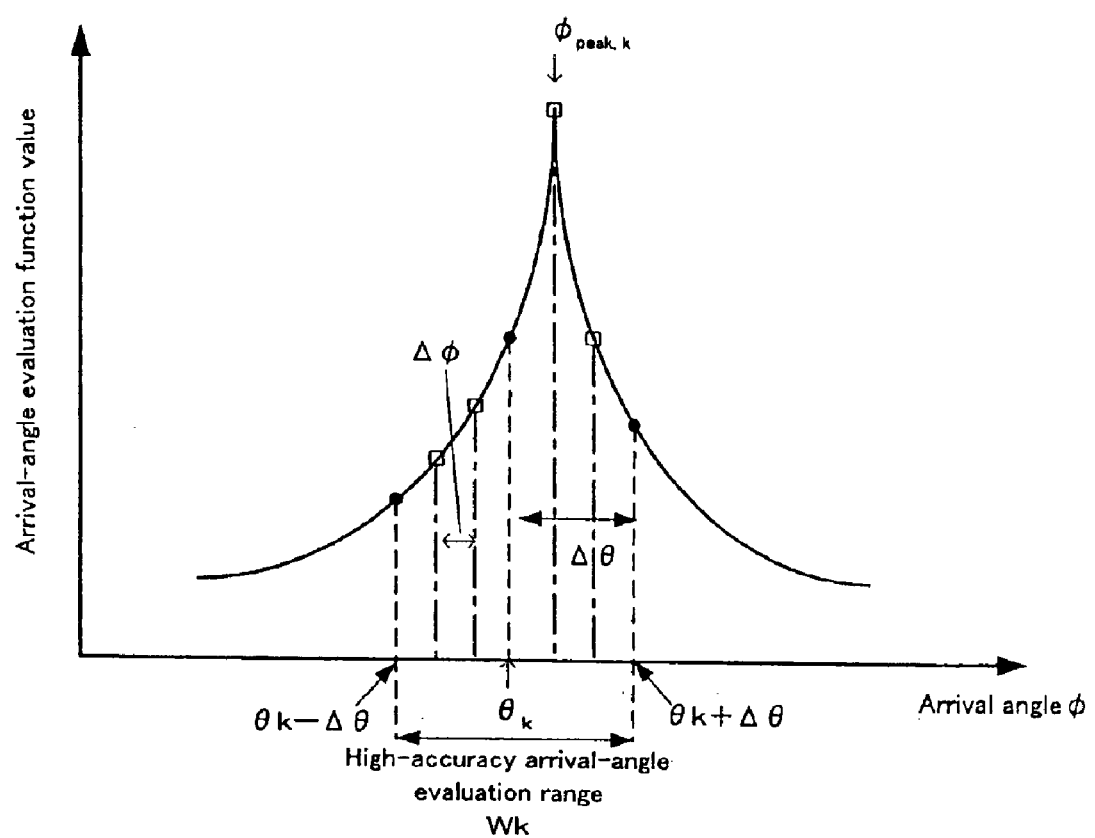
FIG. 14 is a graph illustrating an operation of a direction estimating process in accordance with exemplary embodiment 11.

FIG. 14 is a graph illustrating operations of high-accuracy arrival-angle evaluation unit 60 and high-accuracy arrival-angle determination unit 61. Arrival-angle evaluation unit 60 reevaluates k arrival angles $\theta k$ (k is a natural number) supplied from arrival-angle determination unit 11 in angle range Wk of $\phi$ satisfying $(\theta k - \Delta\theta) < \phi < (\theta + \Delta\theta)$, at angle step $\Delta\phi$ smaller than the angle step $\Delta\theta$ in arrival-angle evaluation unit 10, and using the arrival-angle evaluation function. Arrival-angle evaluation unit 60 then outputs the resultant arrival angle, which is highly accurate, to arrival-angle determination unit 61.

Arrival-angle determination unit 61, based on evaluated values in k angle ranges Wk, detects peak direction $\phi$peak,k in each angle range Wk, and outputs the peak direction as an evaluated high-accuracy arrival angle.

In the present embodiment, an arrival-angle has been more accurately reevaluated at a step smaller than angle step $\Delta\theta$ in arrival-angle evaluation unit 10 restrictively in a range around the arrival angle estimated in arrival-angle determination unit 11. Therefore, the direction estimating processor in the present embodiment not only produces the advantage shown in embodiment 1, but also can highly accurately estimate the arrival angle without unnecessarily increasing the calculation amount for the arrival-angle evaluation function.

The operations in the present embodiment have been described in the structure comprising high accuracy evaluation unit 60 and high-accuracy arrival-angle determination unit 61 in addition to direction estimating processor 12 shown in embodiment 1. The present embodiment can produce a similar advantage even in a structure comprising these units in addition to direction estimating processor shown in each of embodiments 2 to 10.

12. Twelfth Exemplary Embodiment

Figure 15:
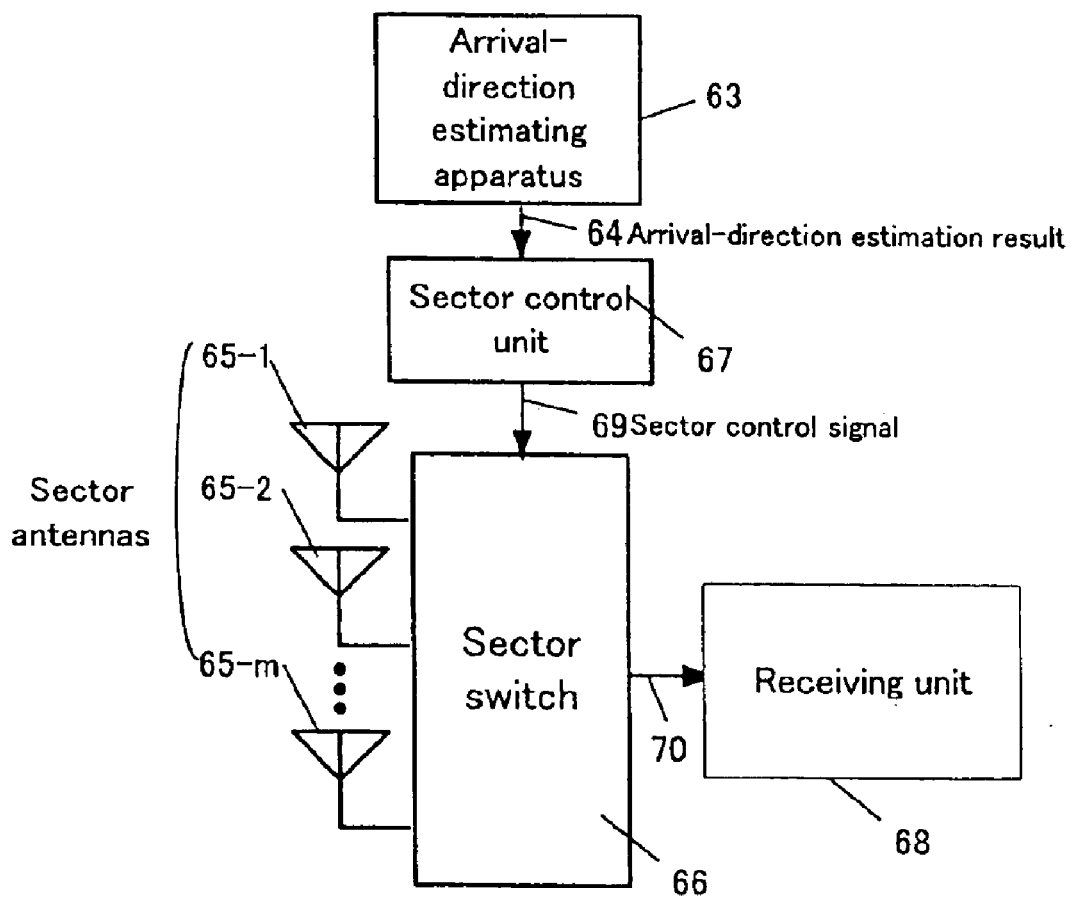
FIG. 15 is a block diagram of a directivity variable receiver in accordance with exemplary embodiment 12 of the present invention.

FIG. 15 is a block diagram illustrating a structure of a directivity variable receiver of the present invention. The directivity variable receiver in FIG. 15 selects a plurality of sector antennas with different main beam directions, and changes the directivity, based on arrival-direction estimation result 64 derived by arrival-direction estimating apparatus 63 as described in embodiments 1 to 11. Operations in arrival-direction estimating apparatus 63 are similar to those described above, so that descriptions of the operations are omitted. Additional components will be described hereinafter.

The directivity variable receiver comprises arrival-direction estimating apparatus 63, m($\geq$2) sector antennas 65-1 to 65-m with different main beam directions, sector switch 66, sector control unit 67, and receiving unit 68.

Operations for estimating a radio-wave arrival direction using received signals 2-1 to 2-M obtained by an array antenna are similar to those described in embodiments 1 to 11. Here the array antenna comprises a plurality of antenna elements 1-1 to 1-M. Final arrival-direction estimation result 64 is fed into sector control unit 67. Sector control unit 67, based on estimation result 64, selects the ms-th sector antenna having a main beam direction closest to the estimated direction from the plurality of sector antennas 65-1 to 65-m. Sector control unit 67 further controls sector switch 66 based on sector control signal 69 to connect sector switch 66 to receiving unit 68. Receiving unit 68 demodulates signal 70 received by the ms-th sector antenna.

These operations allow the selection of the optimal sector antenna having the main beam direction closest to the arrival direction from a plurality of sector antennas 65-1 to 65-m, and provide received signal 70 with a high signal-to-noise ratio. Many waves having directions different from the main beam direction of the selected antenna can be suppressed, and interference between codes can be reduced.

The present embodiment shows a structure of the receiver; however, the receiver can be also used as a transmitter by replacing receiving unit 68 with a transmitting unit. In this case, transmitted power is reduced and radio waves are not radiated in unnecessary directions, so that interference with other station can be reduced.

Figure 16:
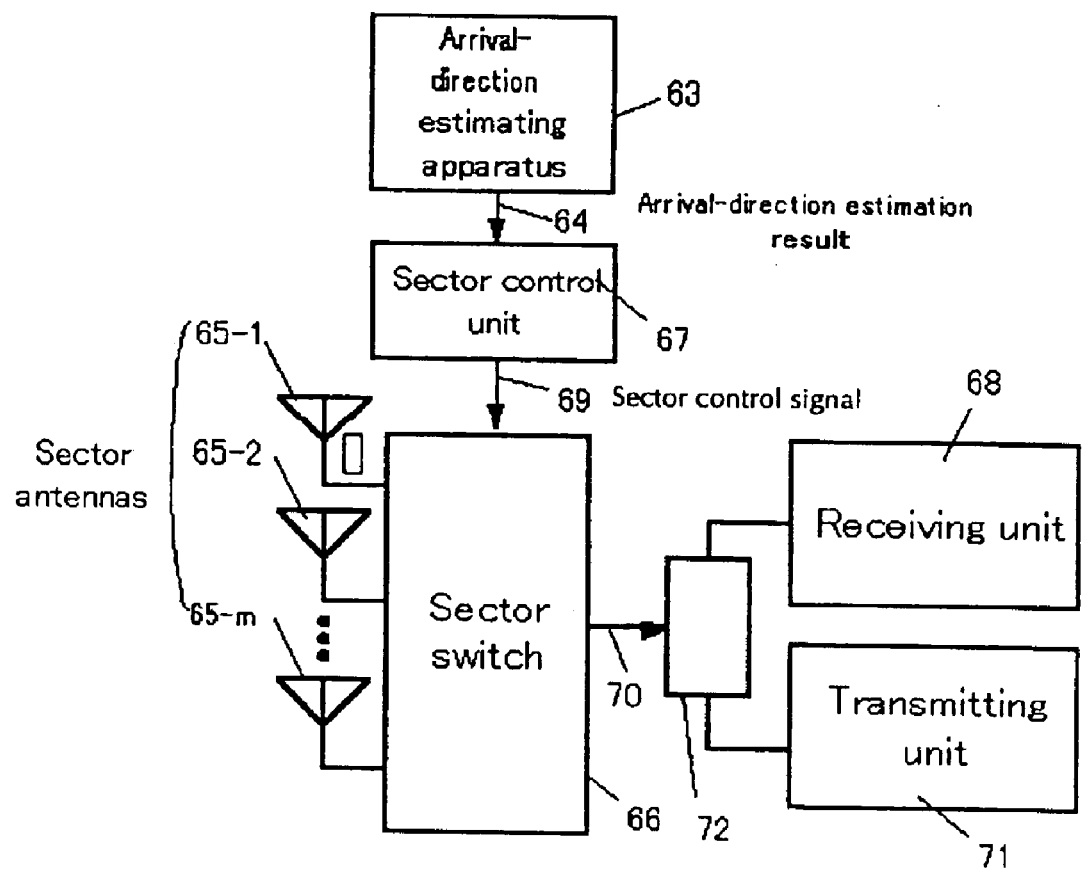
FIG. 16 is a block diagram of a directivity variable transceiver in accordance with exemplary embodiment 12.

Receiving unit 68 and transmitting unit 71 may be intercoupled through a switch 72 as shown in FIG. 16 to provide a transceiver capable of switching between the reception and the transmission.

13. Thirteenth Exemplary Embodiment

Figure 17:
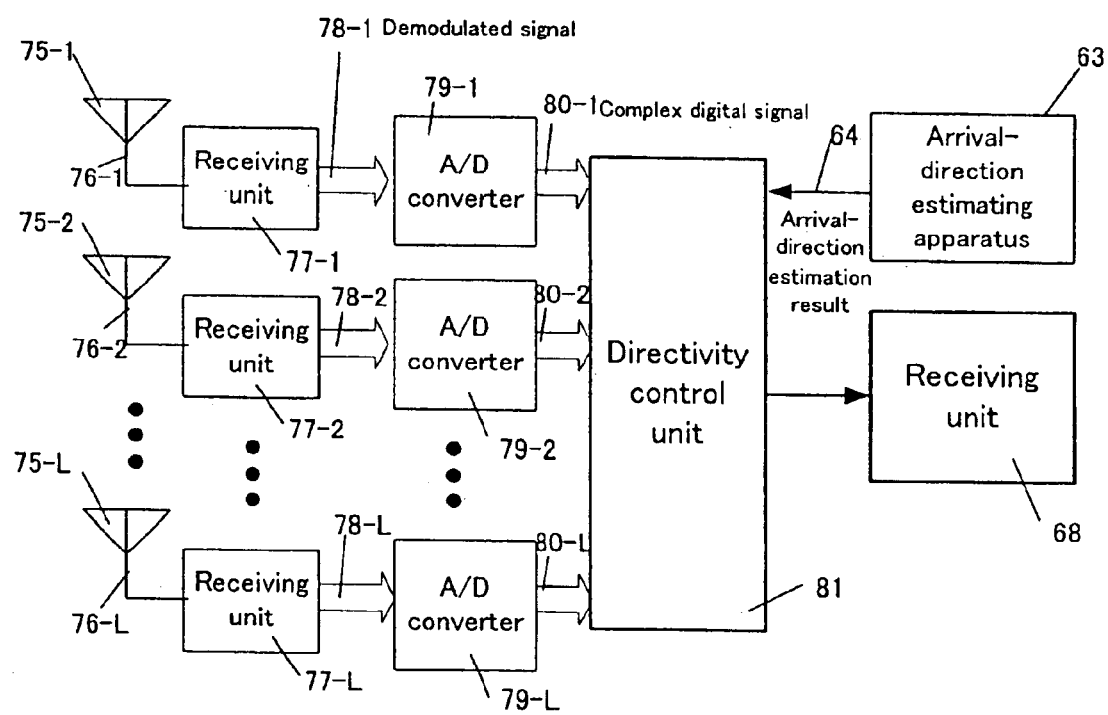
FIG. 17 is a block diagram of a directivity variable receiver in accordance with exemplary embodiment 13 of the present invention.

FIG. 17 is a block diagram illustrating another structure of a directivity variable receiver of the present invention. The directivity variable receiver in FIG. 17 changes directivity and receives signals, based on arrival-direction estimation result 64 derived by arrival-direction estimating apparatus 63 as described in embodiments 1 to 11. Operations in arrival-direction estimating apparatus 63 are similar to those described in embodiments 1 to 11, so that descriptions of the operations are omitted. Additional components will be described hereinafter.

L(>1) antenna elements 75-1 to 75-L may have a structure for dividing signals sent from antenna elements 1-1 to 1-M in FIG. 1 into two, but antenna elements having a different structure will be described hereinafter. Receiving units 77-1 to 77-L connected to respective antenna elements 75-1 to 75-L convert frequencies of signals 76-1 to 76-L received by antenna elements 75-1 to 75-L, and then demodulate the converted signals to signals 78-1 to 78-L comprising orthogonal I and Q signals. A/D converters 79-1 to 79-L convert respective demodulated signals 78-1 to 78-L, which are analog, to complex digital signals 80-1 to 80-L. Sampling frequencies fs of A/D converters 79-1 to 79-L must satisfy Nyquist condition, fs$\geq$2WB, in band WB (Hz) of transmitted modulated wave so that the signals can be subsequently demodulated. Directivity control unit 81 assigns complex weights to complex digital signals 80-1 to 80-L, based on arrival-direction estimation result 64 from arrival-direction estimating apparatus 63. Here the complex weights are used for controlling the directivity. Receiving unit 68 receives the weighted signals.

As discussed above, directivity control unit 81 assigns complex weights to complex digital signals 80-1 to 80-L and combines the signals with each other to generate directivity in the direction of arrival-direction estimation result 64. A more optimal directivity pattern can be created in this case, communication quality higher than that using a sector antenna is allowed.

Figure 18:
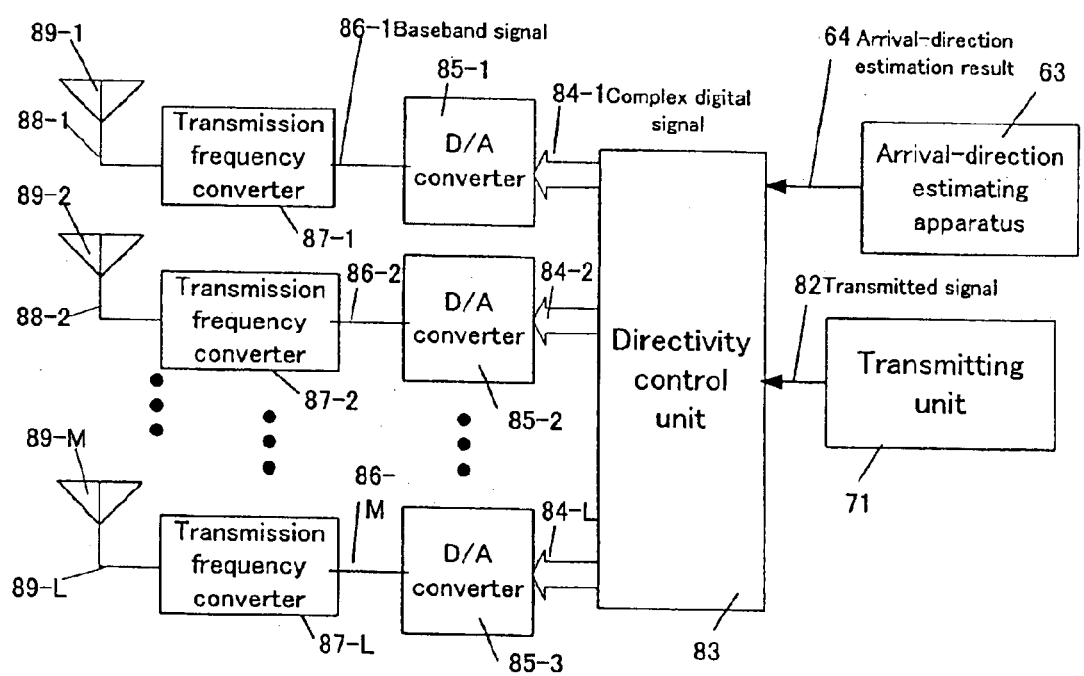
FIG. 18 is a block diagram of a directivity variable transmitter in accordance with exemplary embodiment 14 of the present invention.

The present embodiment shows a structure for controlling the directivity in the receiver; however, a structure for controlling the directivity in a transmitter may be also employed as shown in FIG. 18. In this case, transmitted power is reduced and radio waves are not radiated in unnecessary directions, so that interference with other station can be reduced.

In FIG. 18, directivity control unit 83 receives signal 82 transmitted from transmitting unit 71. Directivity control unit 83 divides transmitted signal 82 into L signals. Directivity control unit 83 then assigns complex weights for controlling the directivity to respective divided signals 82, based on arrival-direction estimation result 64 from arrival-direction estimating apparatus 63, and outputs resultant complex digital signals 84-1 to 84-L. D/A converters 85-1 to 85-L convert the digital signals to analog signals, and output the analog signals as base band signals 86-1 to 86-L. Transmission frequency converters 87-1 to 87-L convert frequencies of base band signals 86-1 to 86-L to a transmission frequency band, and output resultant RF signals 88-1 to 88-L. Antenna elements 89-1 to 89-L transmit signals.

A transceiver having functions shown in FIG. 17 and FIG. 18 can be employed. In this case, communication quality can be improved, and transmitted power is reduced and radio waves are not radiated in unnecessary directions to reduce interference with other station.

The radio-wave arrival-direction estimating apparatus of the present invention can reduce a total calculation amount for arrival-angle evaluation using an arrival-angle evaluation function, without causing estimation accuracy degradation of the arrival direction. The estimating apparatus can also speed a calculation process or simplify an apparatus structure. Additionally, high quality communication is allowed, when the transmitting units or the receiving units in the transceiver have additional antennas having a directivity control function for generating directivity to the arriving direction of the arrival-direction estimating apparatus.

What is claimed is:

1. A radio-wave arrival-direction estimating method comprising:

(a) calculating a correlation matrix of signals received by an array antenna including a plurality of the antenna elements by correlation calculation between the antenna elements;

(b) calculating a noise spatial eigenmatrix by eigenvalue factorization of the correlation matrix, one of a row and a column of the noise spatial eigenmatrix being an eigenvector belonging to a noise eigen-space;

(c) factorizing a matrix including a product of the noise spatial eigenmatrix and a conjugated and transposed matrix of the noise spatial eigenmatrix to a product of one of an upper triangular matrix and a lower triangular matrix;

(d) calculating an evaluation value of an arrival-angle evaluation function every predetermined angle, the arrival-angle evaluation function being expressed using the one of the upper triangular matrix and the lower triangular matrix; and (e) determining an arrival angle based on the evaluation value every predetermined angle.

2. A radio-wave arrival-direction estimating method according to claim 1 further comprising a step of unitary-transforming the correlation matrix between step (a) and step (b), when the plurality of antenna elements are arranged linearly at a constant interval.

3. A radio-wave arrival-direction estimating method comprising:

(a) calculating a correlation matrix of signals received by an array antenna including a plurality of the antenna elements by correlation calculation between the antenna elements;

(b) calculating an inverse matrix of the correlation matrix;

(c) factorizing the inverse matrix to a product of one of an upper triangular matrix and a lower triangular matrix;

(d) calculating an evaluation value of an arrival-angle evaluation function every predetermined angle, the arrival-angle evaluation function being expressed using the one of the upper triangular matrix and the lower triangular matrix; and (e) determining an arrival angle based on the evaluation value every predetermined angle.

4. A radio-wave arrival-direction estimating method according to claim 3 further comprising a step of unitary-transforming the correlation matrix between step (a) and step (b), when the plurality of antenna elements are arranged linearly at a constant interval.

5. A radio-wave arrival-direction estimating method comprising:

(a) calculating a correlation matrix of signals received by an array antenna including a plurality of the antenna elements by correlation calculation between the antenna elements;

(b) factorizing the correlation matrix to a product of one of an upper triangular matrix and a lower triangular matrix;

(c) calculating an inverse matrix of the one of the upper triangular matrix and the lower triangular matrix;

(d) calculating an evaluation value of an arrival-angle evaluation function every predetermined angle, the arrival-angle evaluation function being expressed using the inverse matrix of the one of the upper triangular matrix and the lower triangular matrix; and (e) determining an arrival angle based on the evaluation value every predetermined angle.

6. A radio-wave arrival-direction estimating method according to claim 5 further comprising a step of unitary-transforming the correlation matrix between step (a) and step (b), when the plurality of antenna elements are arranged linearly at a constant interval.

7. A radio-wave arrival-direction estimating method comprising:

(a) calculating a correlation matrix of signals received by an array antenna including a plurality of the antenna elements by correlation calculation between the antenna elements;

(b) factorizing the correlation matrix to a product of one of an upper triangular matrix and a lower triangular matrix;

(c) calculating an evaluation value of an arrival-angle evaluation function every predetermined angle, the arrival-angle evaluation function being expressed using the one of the upper triangular matrix and the lower triangular matrix; and (e) determining an arrival angle based on the evaluation value every predetermined angle.

8. A radio-wave arrival-direction estimating method according to claim 7 further comprising a step of unitary-transforming the correlation matrix between step (a) and step (b), when the plurality of antenna elements are arranged linearly at a constant interval.

9. A radio-wave arrival-direction estimating method comprising:

(a) calculating a correlation vector of signals received by an array antenna including a plurality of the antenna elements by correlation calculation between a reference antenna element and another antenna element;

(b) unitary-transforming the correlation matrix when the plurality of antenna elements are arranged linearly at a constant interval;

(c) calculating an evaluation value of an arrival-angle evaluation function every predetermined angle, the arrival-angle evaluation function being expressed using the correlation vector; and (d) determining an arrival angle based on the evaluation value every predetermined angle.

* * * * *